United States Patent
Zhou et al.

(10) Patent No.: US 11,371,944 B2
(45) Date of Patent: Jun. 28, 2022

(54) SHEARED PAD DETECTION SYSTEMS AND METHODS

(71) Applicant: Beckman Coulter, Inc., Brea, CA (US)

(72) Inventors: Jindan Zhou, Brea, CA (US); Carlos Ramirez, Brea, CA (US); Patricio Vidal, Brea, CA (US); Christophe Godefroy, Brea, CA (US); Gregory Yeager, Brea, CA (US); Jorge Leon, Brea, CA (US)

(73) Assignee: Beckman Coulter, Inc., Brea, CA (US)

( * ) Notice: Subject to any disclaimer, the term of this patent is extended or adjusted under 35 U.S.C. 154(b) by 523 days.

(21) Appl. No.: 16/468,334

(22) PCT Filed: Dec. 15, 2017

(86) PCT No.: PCT/US2017/066869
§ 371 (c)(1),
(2) Date: Jun. 11, 2019

(87) PCT Pub. No.: WO2018/112438
PCT Pub. Date: Jun. 21, 2018

(65) Prior Publication Data
US 2019/0346371 A1    Nov. 14, 2019

Related U.S. Application Data

(60) Provisional application No. 62/434,964, filed on Dec. 15, 2016.

(51) Int. Cl.
*G01N 21/78* (2006.01)
*G01N 21/77* (2006.01)
(Continued)

(52) U.S. Cl.
CPC .............. *G01N 21/78* (2013.01); *G06V 10/22* (2022.01); *G01N 2021/7759* (2013.01); *G06T 7/0012* (2013.01); *G06V 10/56* (2022.01)

(58) Field of Classification Search
CPC ........... G01N 21/78; G01N 2021/7759; G06V 10/22; G06V 10/56; G06V 2201/06; G06T 7/0012
See application file for complete search history.

(56) References Cited

U.S. PATENT DOCUMENTS

| | | | |
|---|---|---|---|
| 5,408,535 A | 4/1995 | Howard, III et al. | |
| 2012/0189509 A1 | 7/2012 | Hsiao | |

(Continued)

FOREIGN PATENT DOCUMENTS

| | | |
|---|---|---|
| BR | 1120190112740 A2 | 10/2019 |
| CN | 104160251 A | 11/2014 |

(Continued)

OTHER PUBLICATIONS

"International Application Serial No. PCT/US2017/066869, International Preliminary Report on Patentability datedJun. 27, 2019", 8 pgs.

(Continued)

*Primary Examiner* — Dennis White
(74) *Attorney, Agent, or Firm* — Schwegman Lundberg & Woessner, P.A.

(57) ABSTRACT

Embodiments of the present invention encompass systems and methods for detecting the presence of a test pad on a test strip. Exemplary techniques involve receiving a test strip having at least one test pad, where individual test pads have a pad width with ink disposed on two ink zones at two opposing sides of the width of the pad, illuminating the at least one test pad with a light source, detecting reflected signals from the test pad, generating an image comprising of pixels of the two ink zones based on the reflected signals, detecting the presence of each of the ink zones by comparing the number of consecutive pixels against a predetermined threshold, and determining the presence of the test pad on (Continued)

the test strip if two ink zones are detected within the pad width.

19 Claims, 24 Drawing Sheets

(51) Int. Cl.
*G06V 10/22* (2022.01)
*G06T 7/00* (2017.01)
*G06V 10/56* (2022.01)

(56) References Cited

U.S. PATENT DOCUMENTS

2013/0267032 A1  10/2013  Tsai et al.
2016/0232421 A1*  8/2016  Decker ................. G01N 21/78

FOREIGN PATENT DOCUMENTS

| CN | 105102698 A | 11/2015 |
| CN | 110431401 A | 11/2019 |
| EP | 0 646 784 A1 | 4/1995 |
| EP | 1111386 A2 | 6/2001 |
| HK | 40015932 A | 9/2020 |
| JP | S6426160 A | 1/1989 |
| JP | H07190940 A | 7/1995 |
| JP | 2001194368 A | 7/2001 |
| JP | 2011180037 A | 9/2011 |
| JP | 2020514685 A | 5/2020 |
| WO | 2018112438 A1 | 6/2018 |

OTHER PUBLICATIONS

"European Application Serial No. 17829807.1, Response to Communication Pursuant to Rules 161 and 162 filed Jan. 16, 2020", 14 pgs.

"European Application Serial No. 17829807.1, Communication Pursuant to Article 94(3) EPC dated May 7, 2020", 4 pgs.

"European Application Serial No. 17829807.1, Response filed Sep. 2, 2020 to Communication Pursuant to Article 94(3) EPC dated May 7, 2020", 12 pgs.

PCT/US2017/066869 received an International Search Report and Written Opinion dated Apr. 19, 2018, 12 pages.

"Chinese Application Serial No. 201780077778.4, Office Action dated Aug. 4, 2021", with English translation, 11 pages.

"Chinese Application Serial No. 201780077778.4, Response filed Dec. 17, 2021 to Office Action dated Aug. 4, 2021", W/ English Claims, 9 pgs.

"European Application Serial No. 17829807.1, Communication Pursuant to Article 94(3) EPC dated May 31, 2021", 5 pgs.

"Indian Application Serial No. 201947027193, First Examination Report dated Jun. 22, 2021".

"Japanese Application Serial No. 2019-530134, Notification of Reasons for Refusal dated Oct. 29, 2021", w/ English translation, 6 pgs.

"Japanese Application Serial No. 2019-530134, Response filed Jan. 21, 2022 to Notification of Reasons for Refusal dated Oct. 29, 2021", W/ English Claims.

* cited by examiner

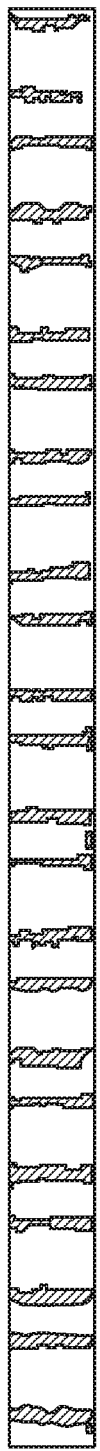 
FIG.9C
 
FIG.9D
 
FIG.9E (B) SHEARED PAD WHERE THE PRINTED LINES ARE MOSTLY GONE. NO LINE PATTERNS ARE DETECTED ON THE PROFILE.

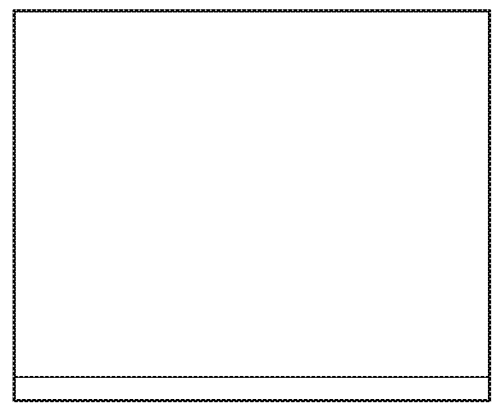
ORIGINAL COLOR IMAGES
BINARY SEGMENTED IMAGES
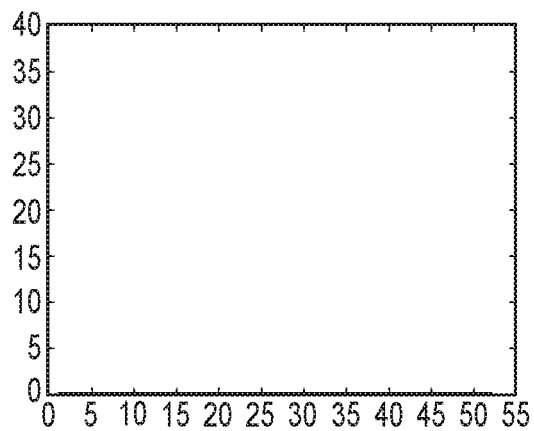
PROFILE PROJECTION OF THE BINARY IMAGES
(C) SEVERE SHEARED PAD WHERE BOTH PRINTED LINES ARE COMPLETE GONE. NO LINE PATTERNS ARE DETECTED ON THE PROFILE.
FIG.9F-3

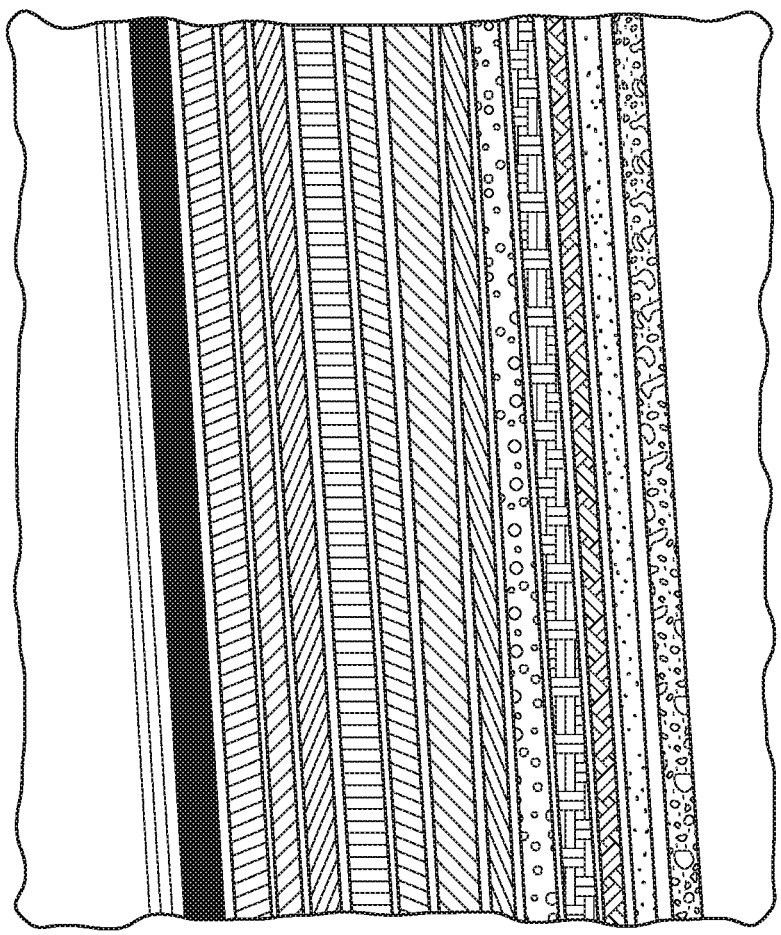
FIG. 9G

BIL  BILIRUBIN
URO  UROBILINOGEN
KET  KETONES
ASC  ASCORBIC ACID
GLU  GLUCOSE
PRO  PROTEIN
BLD  BLOOD
PH   PH
NIT  NITRITE
LEU  LEUKOCYTES
COM  COLOR COMPENSATION (NO REAGENT)
SG   SPECIFIC GRAVITY

DATASET

- 2016-06-22 - UNDOSED - CONTROLS - NORMAL AND SHEARED - WHITEOUT BASE PHTHALO BLUE (516)
- PHTHALO BLUE = RGB (0,144,201)

| IMAGEBASENAME | SHEARED | DOSED | CONTROL |
|---|---|---|---|
| 20160622102251 | N | N | N |
| 20160622102320 | N | N | N |
| 20160622102335 | N | N | N |
| 20160622102856 | Y | N | N |
| 20160622102910 | Y | N | N |
| 20160622103415 | Y | N | N |
| 20160622105508 | N | Y | CA |
| 20160622105522 | N | Y | CB |
| 20160622105537 | N | Y | CC |
| 20160622100054 | Y | Y | CA |
| 20160622110109 | Y | Y | CB |
| 20160622110323 | Y | Y | CC |

FIG.22

| | COLOR SPACE | ACCURACY RATE | FPR | FNR | SENSITIVITY | SPECIFICITY |
|---|---|---|---|---|---|---|
| UNDOSED | RGB | 95.8% | 0 | 8.3% | 91.7% | 100% |
| | HSV | 95.8% | 0 | 8.3% | 91.7% | 100% |
| DOSED | RGB | 97.2% | 0 | 5.6% | 94.4% | 100% |
| | HSV | 97.2% | 0 | 5.6% | 94.4% | 100% |

SUMMARY
• THE FALSE DETECTION (FN IN THIS CASE) ARE MAINLY
 CAUSED BY SHEARING CONDITION, MEANING THE SHEARING
 IS NOT OBVIOUS FOR THESE FN PADS

SHEARED PAD DETECTION SYSTEMS AND METHODS

CROSS-REFERENCE TO RELATED APPLICATIONS

This application is a U.S. national phase under 35 U.S.C. § 371 of PCT International Application Number PCT/US2017/066869, filed on Dec. 15, 2017, entitled "SHEARED PAD DETECTION SYSTEMS AND METHODS," which claims the benefit of priority to U.S. Provisional Patent Application No. 62/434,964, filed on Dec. 15, 2016, entitled "SHEARED PAD DETECTION SYSTEMS AND METHODS," each of which is hereby incorporated by reference in its entirety.

BACKGROUND OF THE INVENTION

Automated chemistry analysis techniques, for example urinalysis, typically involve the use of consumable chemistry test strips. Exemplary urine chemistry systems provide high throughput analysis of hundreds of samples per hour, with excellent performance and productivity. It has been discovered, however, that false negatives may result due to missing or sheared pads in the strips.

BRIEF SUMMARY OF THE INVENTION

Embodiments of the present invention encompass the use of image recognition systems and methods to detect sheared or missing pads from a chemistry test strip where the pads are marked with ink. In some instances, ink line irregularity can be an indication of a sheared pad. Exemplary embodiments provide a beneficial reduction of false negative results which result from sheared analyte pads on urine chemistry strips.

Exemplary chemistry analysis systems can evaluate urine chemistries, color, clarity, specific gravity, and other parameters. In some cases, a chemistry strip can include a color compensation pad to assist in reading highly pigmented samples. Analysis systems can be provided as a stand-alone system or as a part of a fully-integrated urine chemistry and microscopy system. Exemplary systems can be used to make measurements that are used to aid in the diagnosis of metabolic disorders, kidney function anomalies, urinary tract infections, liver function, and other biological conditions. Exemplary techniques can be used in a clinical laboratory and for in vitro applications.

Chemistry strips can suffer from recurring sheared pads that are typically undetected by the current instrument capabilities. It has been discovered that the use of a printing process (e.g. continuous) of a mark (e.g. line) using a selected color can provide a strip that is capable of indicating shearing of the pads by the removal of the line. When an in vitro instrument captures an image of the strip, an algorithm will detect the presence of the lines in the pad. If the lines are not detected then the pad is presumed sheared.

Embodiments of the present invention encompass systems and methods for detecting the presence of a test pad on a test strip. Exemplary methods include receiving a test strip having at least one test pad, where each test pad has a pad width with ink disposed on two ink zones at two opposing sides of the width of the pad, illuminating at least one test pad with a light source, detecting reflected signals from the test pad, generating an image comprising of pixels of the two ink zones based on the reflected signals, detecting the presence of each of the ink zones by comparing the number of consecutive pixels against a predetermined threshold, and determining the presence of the test pad on the test strip if two ink zones are detected within the pad width. The consecutive pixels may comprise consecutive pixels having the same characteristic; for example, color or color component or a representation of the color or color component. Alternatively, the consecutive pixels may comprise consecutive pixels having closely similar characteristics; for example, colors or color components or representations of the colors or color components which are respectively similar to within a predetermined threshold. The pixels may be consecutive by being adjacent to each other in a direction of the width of the pad in the image. The consecutive pixels may represent a width of one of the ink zones. In some cases, the pad width is about 0.2" (0.51 cm). In some cases, the pad width is about 0.197" (0.50 cm). In some cases, the predetermined threshold is 2 pixels. In some cases, the step of generating an image includes converting the reflected signals to a binary image by applying a set of thresholds in a RGB color space, cleaning the binary image, and filtering small areas of the image corresponding to noise. The small areas of the image may comprise one or more pixels having a respective pixel characteristic which is not shared by any other pixel in the image, or is shared by a number of other pixels below a predetermined threshold number. In some cases, the pad has a first color and the ink has a second color that is different from the first color. In some cases, the second color is phthalo blue or emerald. In some cases, the ink color is different from color of pad. In some cases, for one or more pads (e.g. pads 1-3, 5-11) the color can be phthalo blue 516 and for one or more pads (e.g. pads 4, 12) the color can be lemon yellow 346. In some cases, for one or more pads (e.g. pads 1-3, 5-11) the color can be emerald 235 and for one or more pads (e.g. pads 4, 12) the color can be lemon yellow 346. In some cases, for one or more pads (e.g. pads 1-12) the color can be phthalo blue 516. In some cases, for one or more pads (e.g. pads 1-3, 5-11) the color can be emerald 235, and for one or more pads (e.g. pads 4, 12) the color can be lemon yellow 346. In some cases, for one or more pads (e.g. pads 1-3, 5-11) the color can be phthalo blue 516 and for one or more pads (e.g. pads 4, 12) the color can be warm grey 1 134. According to some embodiments, the width of the ink zone is about 0.02" (0.51 mm) to 0.03" (0.76 mm). According to some embodiments, the pad has an upper surface and a pad thickness and is absorbent or absorptive, and the ink is absorbed into the pad at a depth of about 20% of the pad thickness from the surface. In some cases, the set of thresholds in the RGB color space is 0 to 50 for Red, 40 to 255 for Green, and 50 to 255 for Blue.

In another aspects, embodiments of the present invention encompass systems for detecting the presence of a test pad on a test strip. Exemplary systems can include a light source for illuminating a test pad, where the test pad has a pad width with ink disposed on two ink zones at two opposing sides of the width of the pad, and an optical unit for detecting reflected signals from the test pad and to create a pixel-based image of the ink zones, where the pixel-based image includes a plurality of pixel sets and each pixel set corresponds to one of the two ink zones. Systems can also include a processor for detecting the presence of each of the ink zones by comparing the number of consecutive pixels against a predetermined threshold, and determining the presence of the test pad on the test strip if two ink zones are detected within the pad width. In some cases, the pad width is about 0.2". In some cases, the predetermined threshold is 2 pixels. In some cases, the optical unit includes an image processor, and the image processor is configured to convert the reflected signals to a binary image by applying a set of thresholds in a RGB color space, clean the binary image, and filter small areas of the image corresponding to noise. In some cases, the pad has a first color and the ink has a second color that is different from the first color. In some cases, the second color is phthalo blue or emerald. In some cases, the width of the ink zone is about 0.02" to 0.03". In some cases, the pad has an upper surface and a pad thickness and is absorbent or absorptive, and the ink is absorbed into the pad at a depth of about 20% of the pad thickness from the surface. In some cases, the set of thresholds in the RGB color space is 0 to 50 for Red, 40 to 255 for Green, and 50 to 255 for Blue.

BRIEF DESCRIPTION OF THE DRAWINGS

FIGS. 8, 9, 9A-9I depict aspects test strips, and experimental data results obtained for test strips, according to embodiments of the present invention.

FIGS. 22-28 depict aspects of various test strip experimental processes and results, according to embodiments of the present invention.

DETAILED DESCRIPTION OF THE INVENTION

Embodiments of the present invention encompass systems and methods that involve the use of an image recognition system to detect sheared or missing pads from a chemistry test strip where the pads are marked with ink. According to some embodiments, an irregularity with the ink lines can be an indication that a pad is sheared.

Figure 1:
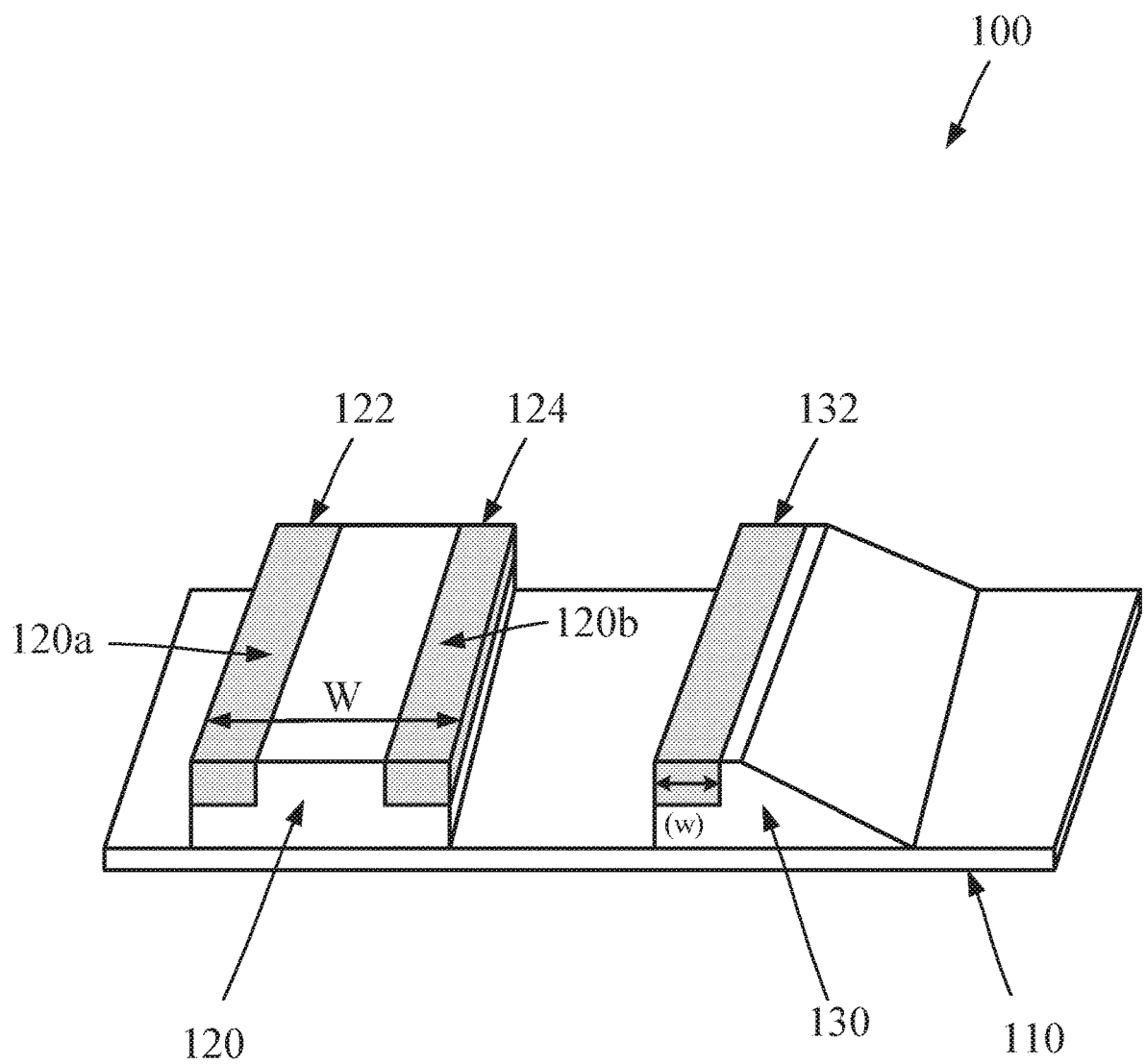
FIG. 1 depicts aspects of a test strip according to embodiments of the present invention.

Turning now to the drawings, FIG. 1 depicts aspects of a test strip 100 according to embodiments of the present invention. As shown here, test strip 100 includes a substrate 110, a first test pad 120, and a second test pad 130. The first test pad 120 is coupled with or adhered to the substrate 110, and includes a first fiducial mark 122 and a second fiducial mark 124. As shown here, the first test pad 120 is completely intact. That is, the first test pad 120 is not sheared, nor is the first test pad 120 separated in any way from the substrate 110. In some cases, a test pad can be coupled with a substrate via an adhesive bonding (not shown here) or any other suitable coupling means. Substrate 110 can be constructed from or contain any of a variety of materials. In some cases, substrate 110 contains or is constructed from Mylar.

The second test pad 130 is coupled with or adhered to the substrate 110, and includes a first fiducial mark 132. In this illustration, the second test pad 130 is sheared. Originally, the second test pad 130 was a complete test pad and included two fiducial marks, similar to the first test pad. However, as shown here, a portion of the second test pad 130 has been sheared and is no longer present. The portion which was sheared contained the second fiducial mark (not shown), and hence the second fiducial mark of the second test pad 130 is now missing.

Any of a variety of techniques can be used to produce the fiducial marks on the test pads. In some cases, a fiducial mark may be an ink mark or an ink line (either solid, dotted, or dashed). In some cases, a fiducial mark may be referred to as an ink zone. In some cases, fiducial marks may be disposed at two different or opposing sides or portions of a test pad. For example, as depicted in FIG. 1, first fiducial mark 122 and second fiducial mark 124 can be disposed at two opposing sides (120a, 120b) of a width W of the first test pad 120. Hence, it can be seen that a test pad can have a pad width with ink disposed on two ink zones at two opposing sides of the width of the pad. In some instances, a continuous printing process can be used to place a mark or line (e.g. ink zone) on the pad. In some cases, a specific color for the mark or line can be used, so as to provide a test strip that is capable of indicating shearing of the pad when the line has been removed or is otherwise not present. According to some embodiments, a pad 120, 130 can have a first color and a fiducial mark 122, 124, 132 (e.g. ink) can have a second color that is different from the first color. As shown here, an ink zone or fiducial mark can have a width (w), and (w) can have a value within a range from between about 0.02 inches to about 0.03 inches.

Figure 2:
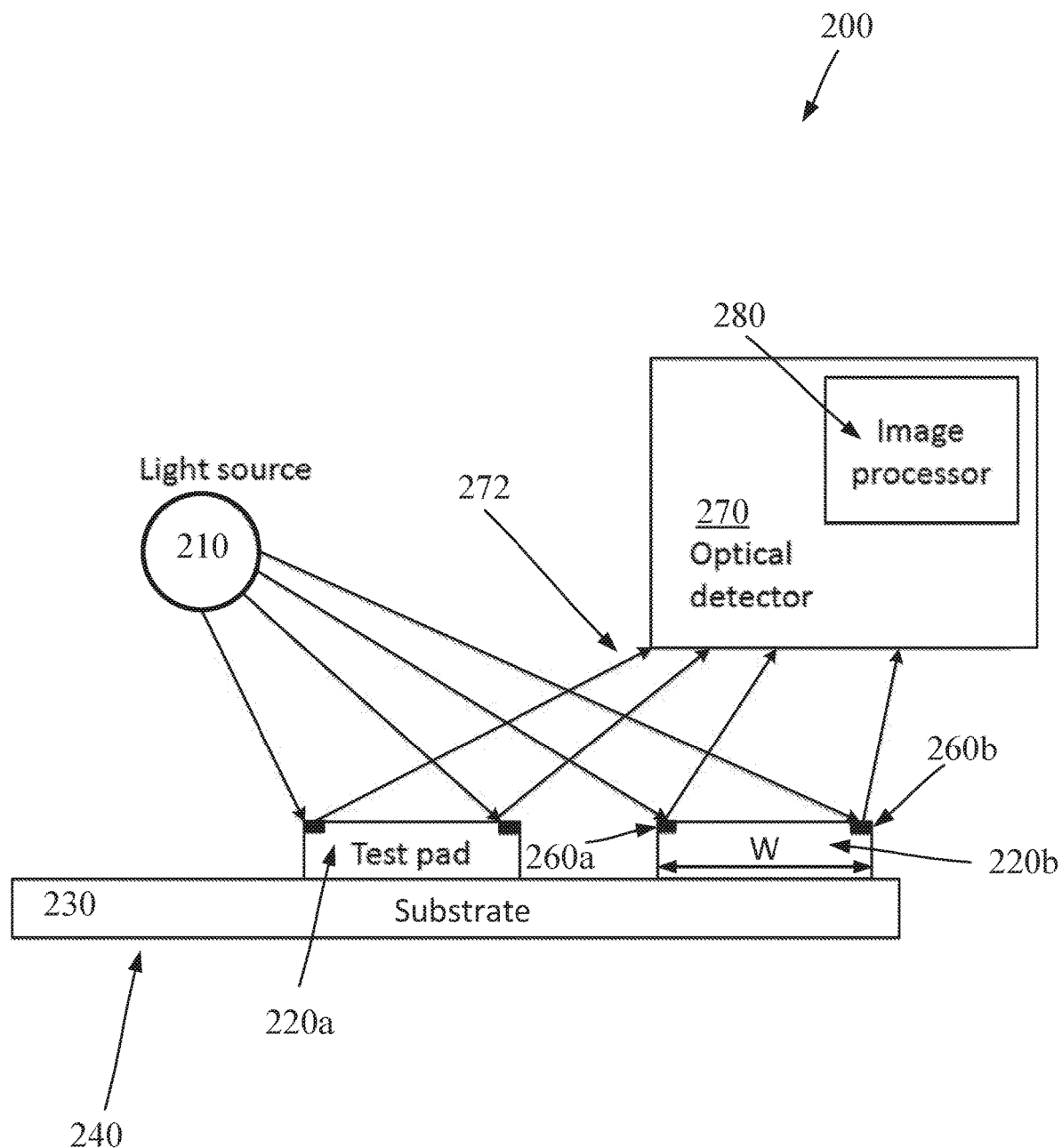
FIG. 2 depicts a system for detecting the presence of a test pad on a test strip substrate, according to embodiments of the present invention.

FIG. 2 depicts an exemplary system for detecting the presence of a test pad on a test strip substrate, according to embodiments of the present invention. As shown here, system 200 includes a light source 210 illuminating one or more test pads 220a, 220b. The test pads are coupled with or adhered to a substrate 230 of a test strip 240. A test pad (e.g. test pad 220a and/or 220b) can have a pad width W with ink disposed on two ink zones 260a, 260b at two opposing sides of the width W of the pad. System 200 can also include an optical unit or detector 270 for detecting reflected signals 272 from the test pad and to create a pixel-based image of the ink zones. In some cases, an optical unit or detector can be a camera or other image acquisition device. An optical unit or detector can include an image sensor such as a charge coupled device (CCD) or a complementary metal oxide semiconductor (CMOS), for example. Typically, the optical unit 270 is configured to acquire a digital image, such as a pixel based image. Exemplary digital image types include GIF, JPEG, PNG, TIFF, BMP, and other image file formats. In some cases, the optical unit 270 is a high optical resolution imaging device that is configured to collect images, for example, using a CCD.

System 200 also includes a processor 280 such as an image processor. In some cases, the processor 280 can receive, as input, image or pixel data from the optical unit. Processor 280 can be configured to detect the presence of each of the ink zones by comparing the number of consecutive pixels (e.g. corresponding to a fiducial mark or ink zone) against a predetermined threshold. In some cases, the predetermined threshold is 2 pixels. Processor 280 also can be configured to determine the presence of the test pad on the test strip if two ink zones are detected within the pad width. In some cases, processor 280 is configured to convert the reflected signals to a binary image by applying a set of thresholds in a RGB color space, clean the binary image, and filter small areas of the image corresponding to noise. According to some embodiments, when system 200 captures an image of the strip, an algorithm (e.g. executed by processor 280) can operate to detect the presence of the zones or lines in the pad. If the zones or lines are not detected then the pad is presumed sheared.

Figure 3:
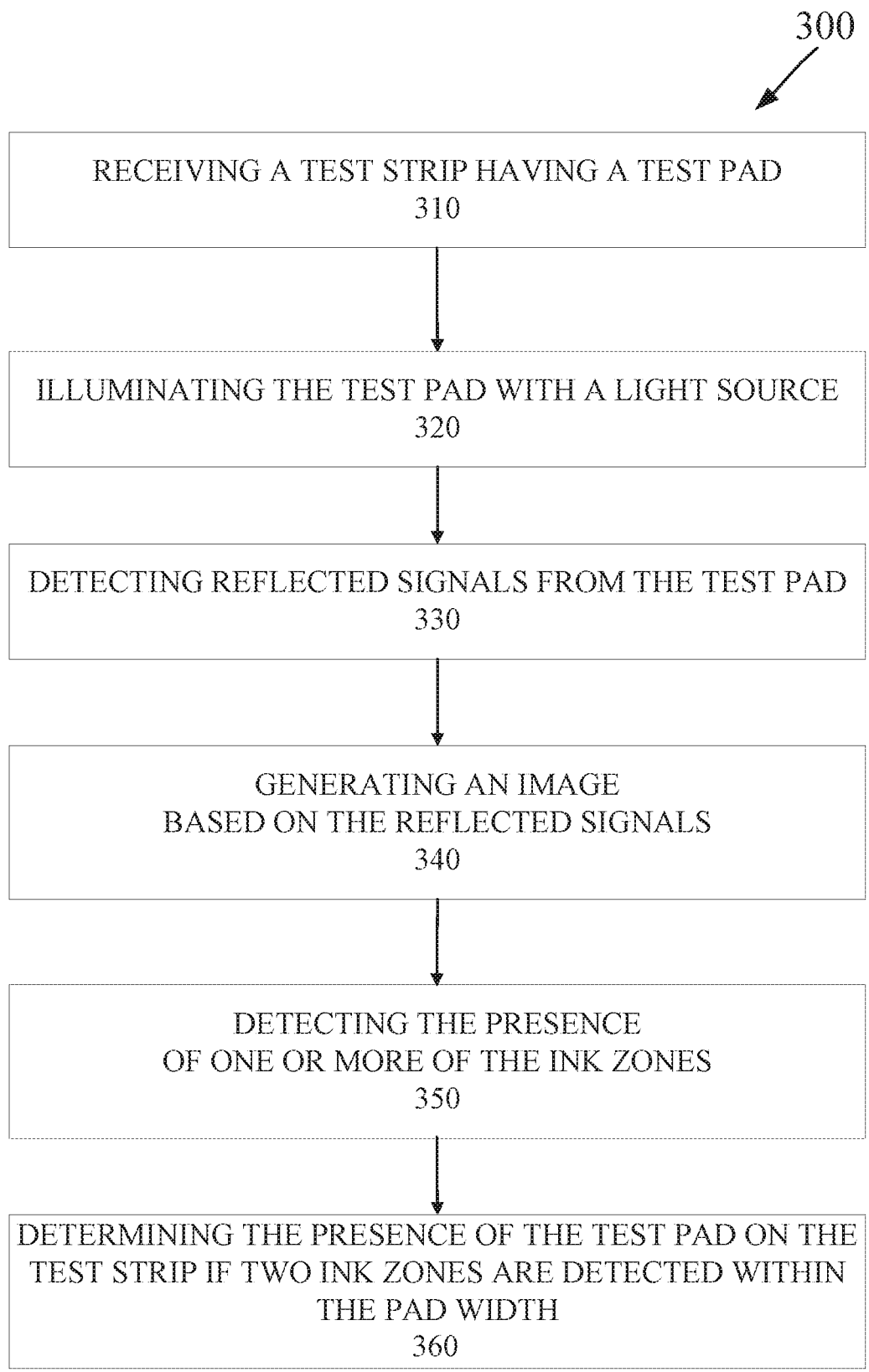
FIG. 3 depicts aspects of a method for detecting the presence of a test pad on a test strip, according to embodiments of the present invention.

FIG. 3 depicts aspects of a method 300 for detecting the presence of a test pad on a test strip, according to embodiments of the present invention. Method 300 may include receiving a test strip having a test pad, as indicated by step 310. As discussed elsewhere herein, a test pad can have a pad width with ink disposed on two ink zones at two opposing sides of the width of the pad. Method 300 also includes illuminating the test pad with a light source, as indicated by step 320, and detecting reflected signals from the test pad, as indicated by step 330. Further, method 300 includes generating an image, comprised of pixels, of one or both of the two ink zones based on the reflected signals, as indicated by step 340. In some cases, the step of generating an image 340 includes converting the reflected signals to a binary image by applying a set of thresholds in a RGB color space, cleaning the binary image, and filtering small areas of the image corresponding to noise. In some cases, the set of thresholds in the RGB color space is 0 to 50 for Red, 40 to 255 for Green, and 50 to 255 for Blue. Method 300 also includes detecting the presence of one or both of the ink zones, for example by comparing the number of consecutive pixels against a predetermined threshold, as indicated by step 350. In some cases, the predetermined threshold is 2 pixels. What is more, method 300 includes determining the presence of the test pad on the test strip if a certain number (e.g. two) of ink zones are detected within the pad width, as indicated by step 360. In some cases, the pad width is about 0.2 inches. In some cases, the pad width is about 0.197 inches. In some instances, the pad has a first color and the ink has a second color that is different from the first color. In some cases, the second color can be phthalo blue. In some cases, the second color can be emerald. In some cases, the ink can be phthalo blue (516) and the pad can be lemon yellow (346). In some cases, the ink can be emerald (235) and the pad can be lemon yellow (346). In some cases, the pad can be phthalo blue (516). In some cases, the ink can be phthalo blue (516) and the pad can be warm grey (134).

Figure 4:
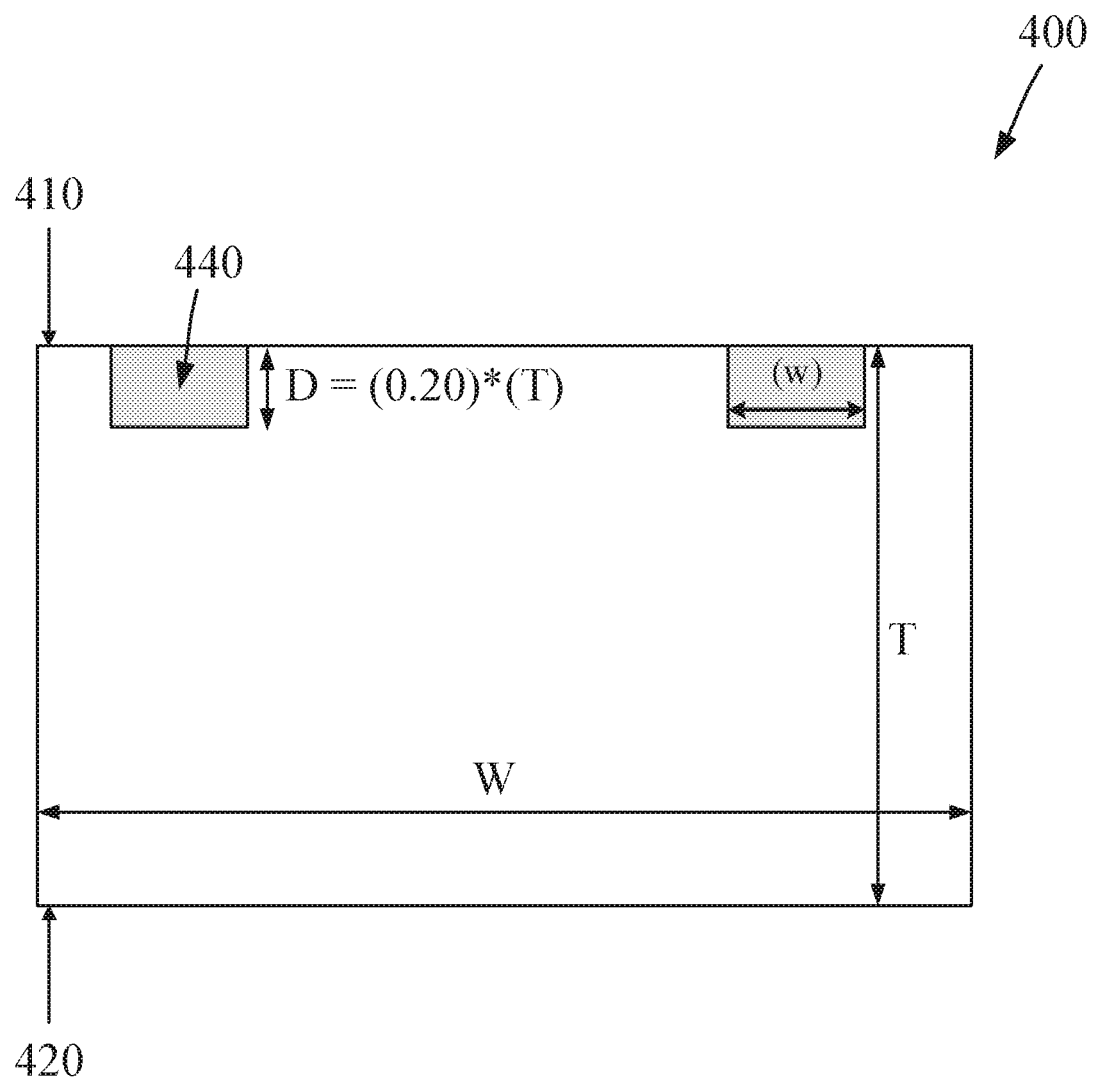
FIG. 4 depicts aspects of a test pad according to embodiments of the present invention.

FIG. 4 depicts a cross-section of a pad 400 according to embodiments of the present invention. As shown here, pad 400 has an upper surface 410, a lower surface, 420, and a pad thickness T defined by the distance between upper surface 410 and lower surface 420. In some cases, pad 400 is absorbent or constructed of an absorbent material. A fiducial mark or ink zone 440 can be present in the pad down to a certain depth D. For example, as illustrated here, fiducial mark includes ink, such that the ink is absorbed into the pad 400 at a depth D (i.e. distance from upper surface 410) that is about 20% of the pad thickness T.

Figure 5:
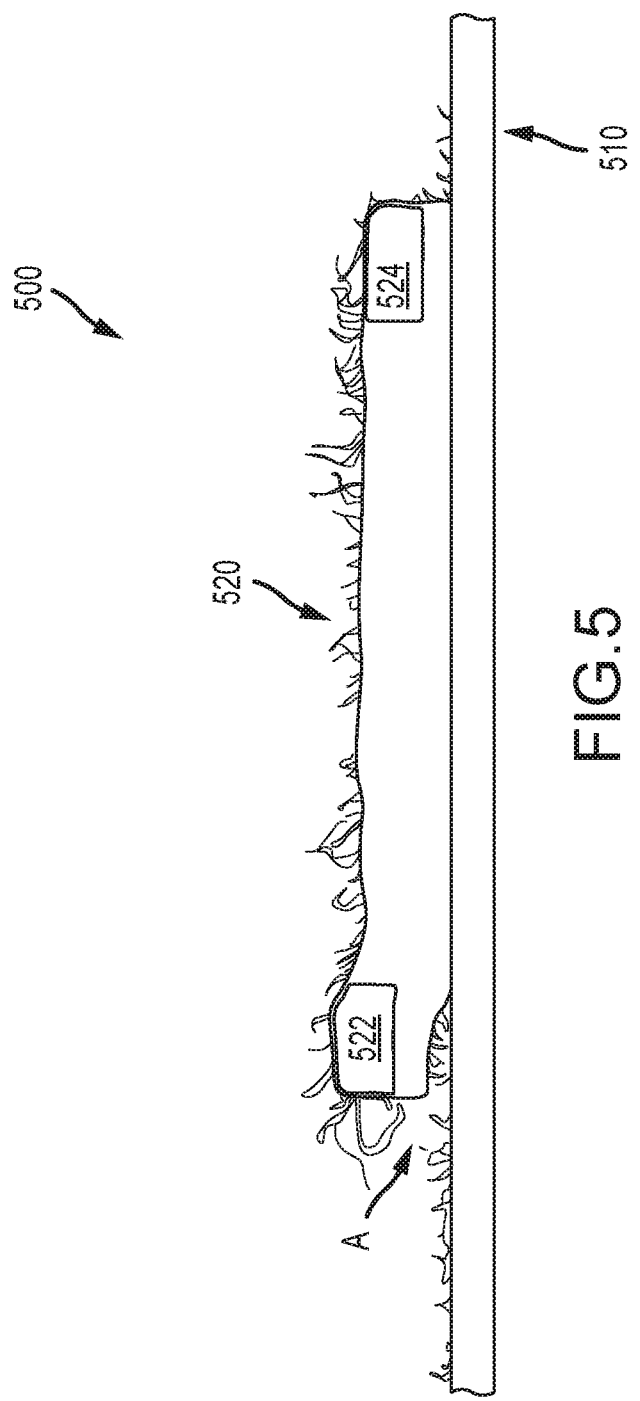
FIG. 5 depicts aspects of a test strip according to embodiments of the present invention.

As noted above with reference to FIG. 1, embodiments of the present invention address situations where one of the lines is missing because a portion of the pad has been sheared off (e.g. test pad 130). Embodiments of the present invention also address situations where the pad is intact and both lines are still present, but one edge of the pad is separated from the substrate, for example as depicted in FIG. 5. Specifically, FIG. 5 depicts aspects of a test strip 500 according to embodiments of the present invention. As shown here, test strip 500 includes a substrate 510 and a test pad 520. The test pad 520 is coupled with or adhered to the substrate 510, and includes a first fiducial mark 522 and a second fiducial mark 524. The portion of the test pad 520 containing first mark 522 is slightly separated from the substrate 510, as indicated by arrow A. According to some embodiments, both marks or lines 522,524 will be detected, and the pad 520 will not be detected or read as "sheared". According to some embodiments, pad 520 will be considered as "normal" for purposes of detecting the presence and/or efficacy of the pad.

Figure 6:
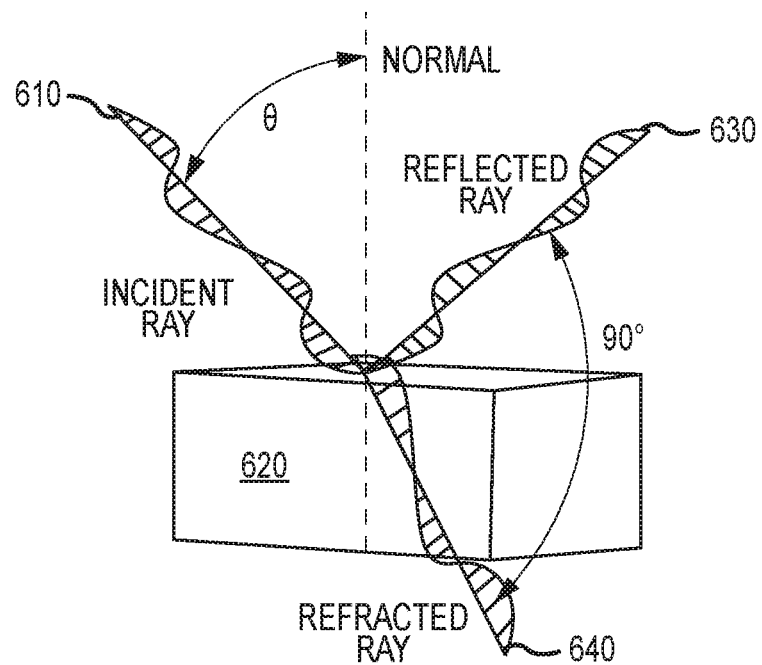
FIG. 6 depicts aspects of a test pad according to embodiments of the present invention.

As noted elsewhere herein, exemplary techniques may include obtaining an image of a test strip based on reflected signals. Certain aspects of reflectance photometry are provided in FIG. 6. As shown here, an incident ray 610 (e.g. beam of light) can be directed toward a test pad 620. Consequently, a first amount of light 630 is reflected from the surface of the test pad, and a second amount of light 640 is refracted through the test pad. According to some embodiments, the amount of light reflected 630 can be captured in the image, or otherwise detected by a photo-detector, thus providing information or a signal that can be analyzed or quantified.

Figure 7:
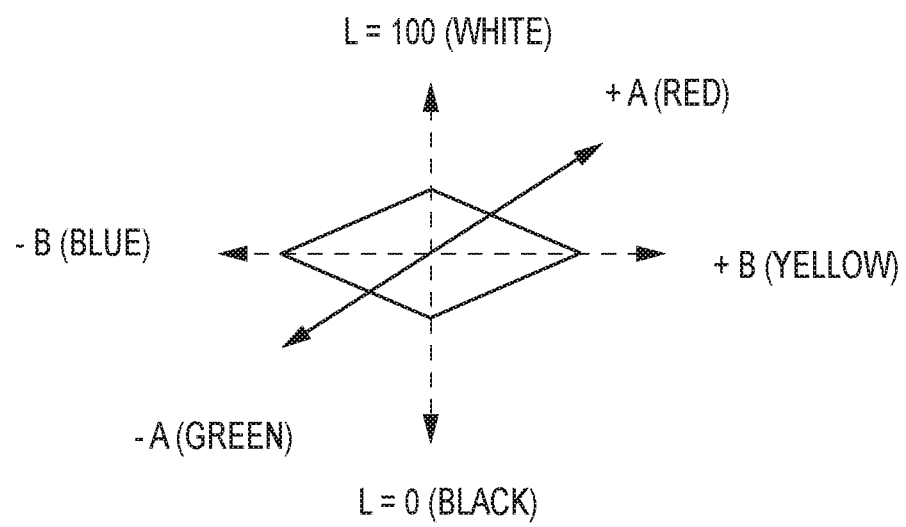
FIG. 7 depicts aspects of a color system according to embodiments of the present invention.

According to some embodiments, a test pad 620 can be constructed from or contain any of a variety of materials. In some cases, a test pad may contain or be constructed from a filter paper having Grade MN 818, Weight 180, Thickness 0.45 mm, Filtration Speed 8 s, Surface smooth, available from Macherey-Nagel. Such paper can be strongly absorbent. In some cases, a test pad may contain or be constructed from a filter paper having Grade MN 215, Weight 145, Thickness 0.35 mm, Migration Distance 10 min, Surface smooth, available from Macherey-Nagel. Such paper can be highly absorptive. In some cases, a material used to fabricate a test pad can be selected based on any of a variety of factors, including without limitation, bending resistance or stiffness, brightness (e.g. the higher the reflectance, the brighter the appearance), bursting strength, burst factor, compressibility, elongation, gloss, grammage, hardness, moisture content, opacity, printability, print quality, ply bond, resiliency, Taber stiffness, surface strength, tearing resistance, tensile strength, thickness, water absorption, wettability, whiteness, and/or color. In some cases, color can be measured or specified in terms of a color space. FIG. 7 depicts an exemplary color system, where L represents a measure of whiteness and varies from 100 for perfect white to 0 for perfect black, A represents redness to greenness, and B represents yellowness to blueness.

Any of a variety of methods may be used to select a desired color for pad fiducial marker detection. For example, one approach to detect the loss of pad material involves the printing of a fiducial shape (i.e., point, line, etc.). The lack of the fiducial mark in the pad will indicate that some of the upper layers are missing and therefore the pad needs to be excluded from further use or analysis. In order to facilitate the automatic image processing and detection of the fiducial mark it may be desirable to incorporate a color feature that facilitates the identification of the mark.

The image resolution, light conditions, instrument settings, and/or true pad color under dosed or undosed conditions can create a large number of unique colors. It may be desirable to use a fiducial mark that has a color that is as different as possible from the known palette of possible pad colors under different conditions. The following approach can be used to automate the selection of a color that maximizes the distance to a known color palette obtained from a database of pad colors.

Figure 8:
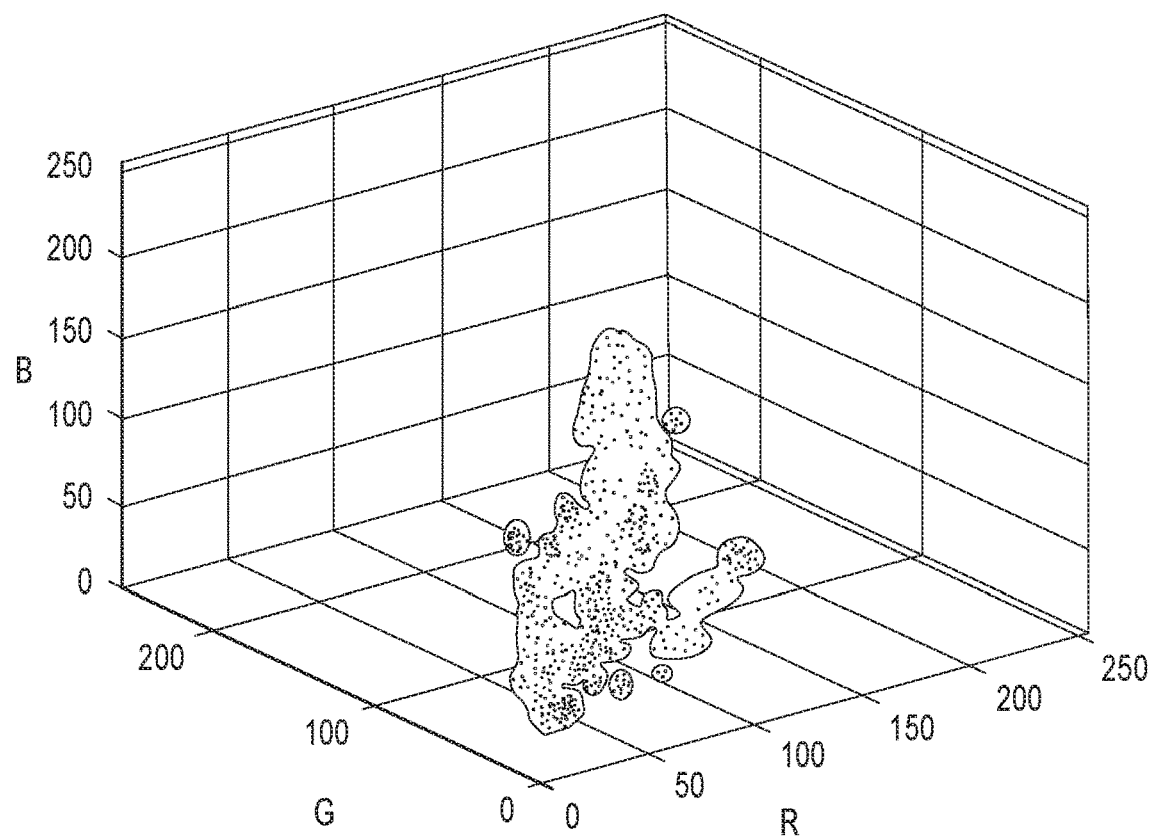

The first step involves selecting a large dataset of strips to cover the diversity of colors captured under different conditions. Strip images are analyzed and w×h image window centered on each pad belonging to each strip is extracted. The value of w and h corresponds to the number of row and column pixels respectively. According to some embodiments, w and h were equal to 20 and found to be appropriate. Given a particular color space (i.e., HSV, RGB, etc.) a 3 dimensional data structure can be created to store a 3 dimensional histogram of size n×n×n, where n is the maximum number of unique values in the corresponding color component. According to some embodiments, the RGB color space can be selected for the color search and n can be set at 255. Each color extracted from each pixel belonging to the w×h pad window can be logged and accumulated in the 3D histogram. Color compensation techniques such as contrast, brightness adjustment or white balancing can be applied at this point to mitigate color variability. FIG. 8 illustrates a resulting 3D histogram for a dataset of strips.

The 3D histogram can then be navigated and bins containing less than a predefined number of events can be removed (i.e., that particular color combination or RGB) from the histogram. This process is a noise removal process that attempts to remove infrequent colors and reduce complexity. According to some embodiments, bins having less than 1000 entries for a dataset of 250 million non-unique colors were found to be appropriate.

Figure 9:
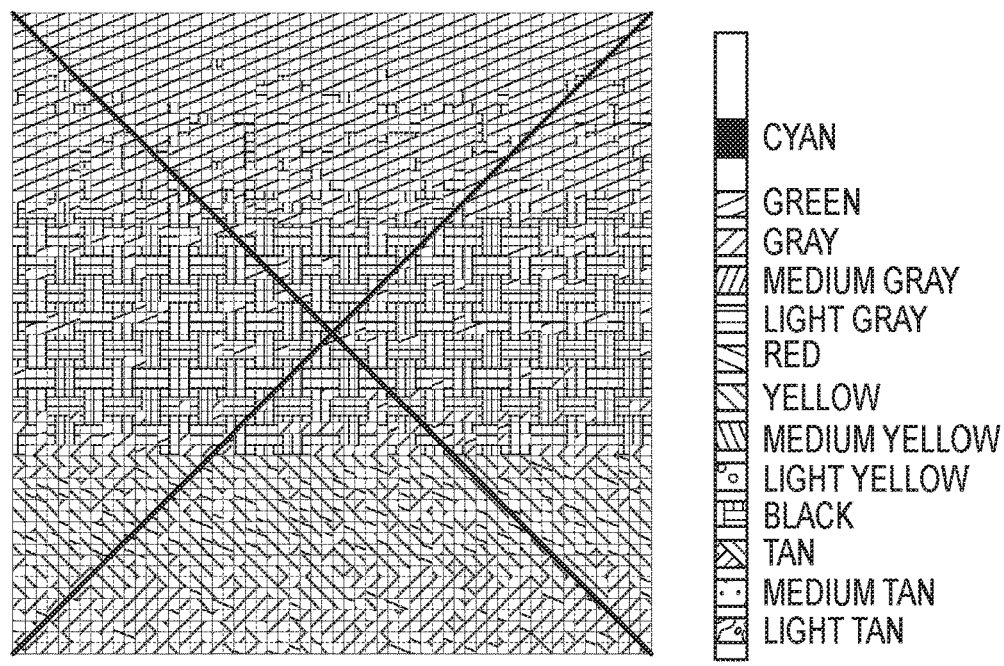

Next, the search for the farthest color from the distribution of colors in the 3D histogram can be conducted. By visualizing the 3D histogram as a 3D cube with 6 faces it can be seen that the farthest color will belong to one of the 6 faces. A face in the 3D cube is then defined as all colors y={R, G, B} where one of the color components is anchored to 0 or n while the other components vary within their range. For each pixel on each cube face i, 1≤i≤6, compute the set $\delta_i = \{d_1, \ldots, d_{n \times n}\}$ of minimum distances to all {R, G, B} remaining positive entries in the 3D histogram. According to some embodiments, the Euclidean distance was found to be appropriate as a distance measure. The farthest color to the 3D histogram is defined as the {R, G, B} color combination having the maximum distance among $\delta_i$. According to some embodiments, the pure color cyan with R, G, B values of 0, 255 and 255 respectively provided was selected as the farthest color. FIG. 9 shows the cyan color (in diagonal lines; bottom left corner to top right corner, and top left corner to bottom right corner) on top of a particular palette of colors from a database of strips.

Additional embodiments are encompassed by the instant disclosure. For example, with regard to selection of line color, in order to facilitate the automatic image processing and detection of the mark it may be desirable to incorporate a color feature that facilitates the identification of the mark. This can be a one-time off-line process and can be conducted over an extended database of strips. The search for the most discriminant color is composed of several steps. An example of a resulting 3D histogram for a particular dataset of strips is discussed elsewhere herein. Each dot in the 3D cube chart corresponds to a bin in the 3D histogram. The color of each dot corresponds to the R, G and B coordinates.

The color selection process can be automated, for example by using the Matlab programming language. The implemented code reads and loads the strip images in memory and proceeds to compute and extract the information outlined herein.

During the manufacturing and later during actual use of the strip consumable, the colored printed line on the strip serves as an instrument quality check integrated in the strip manufacturing process. This quality check point offers redundancy and a check point for inspection of the pad condition of the strip.

Figure 9A:
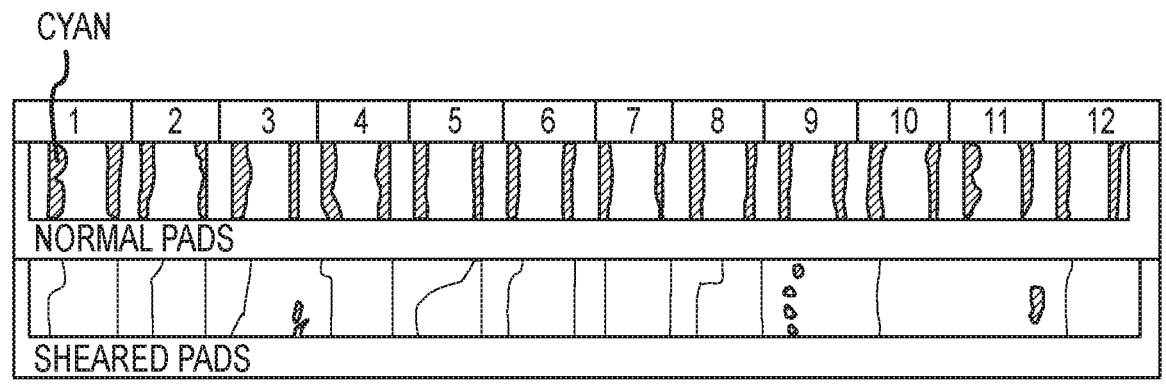

Embodiments of the present invention encompass various techniques for the detection of line marks for identifying missing or sheared pads. In one approach of using line marks for identifying the missing pads, each pad is printed with two vertical lines on the surface close to its left and right boundaries during the strip manufacturing. When the strip is used for urinalysis, the line marks can be checked for the presence on the pads. A normal pad should have both line marks presented when used for sample analysis. On the contrary, when a pad is sheared, the line marks printed on the surface of the pad will be damaged or completely disappear, as the consequence of missing its top layers. FIG. 9A depicts examples of normal and sheared pads from two strips. Each strip has twelve pads marked with cyan colored lines on both boundaries. The strip on the top row does not have sheared pads, whereas all the pads on the bottom strip are sheared, as indicated by the presence of the line marks, or the missing line marks, respectively.

Embodiments of the present invention encompass a variety of techniques for image segmentation. For instance, an exemplary pad can be marked with a cyan color that is unique from the pad colors, and the white strip background, and an image segmentation stage using the color information can be applied first to segment out the line mark regions from the image. The RGB color space is used for the segmentation. A color filter using all Red, Green and Blue color channels information is applied to every pixel on the image:

Rmin<Red<Rmax and
Gmin<Green<Gmax and
Bmin<Blue<Bmax

Here, Rmin, Gmin, Bmin are the lower bound thresholding values in Red, Green and Blues channels, Rmax, Gmax, Bmax are the upper bound thresholding values in Red, Green and Blues channels respectively. Red, green, and blue image channel values are on a scale from 0 to 255. Pixels passed the filter are considered on the line mark regions.

Figure 9B:
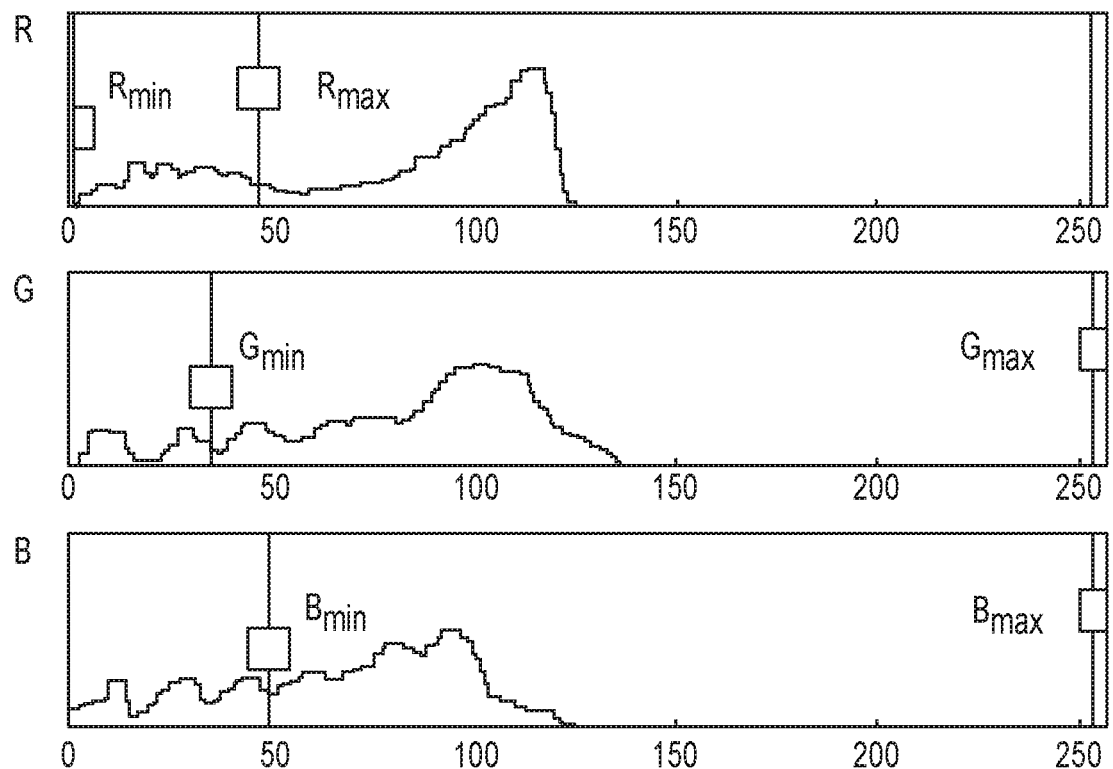
Figures 1, 9F:
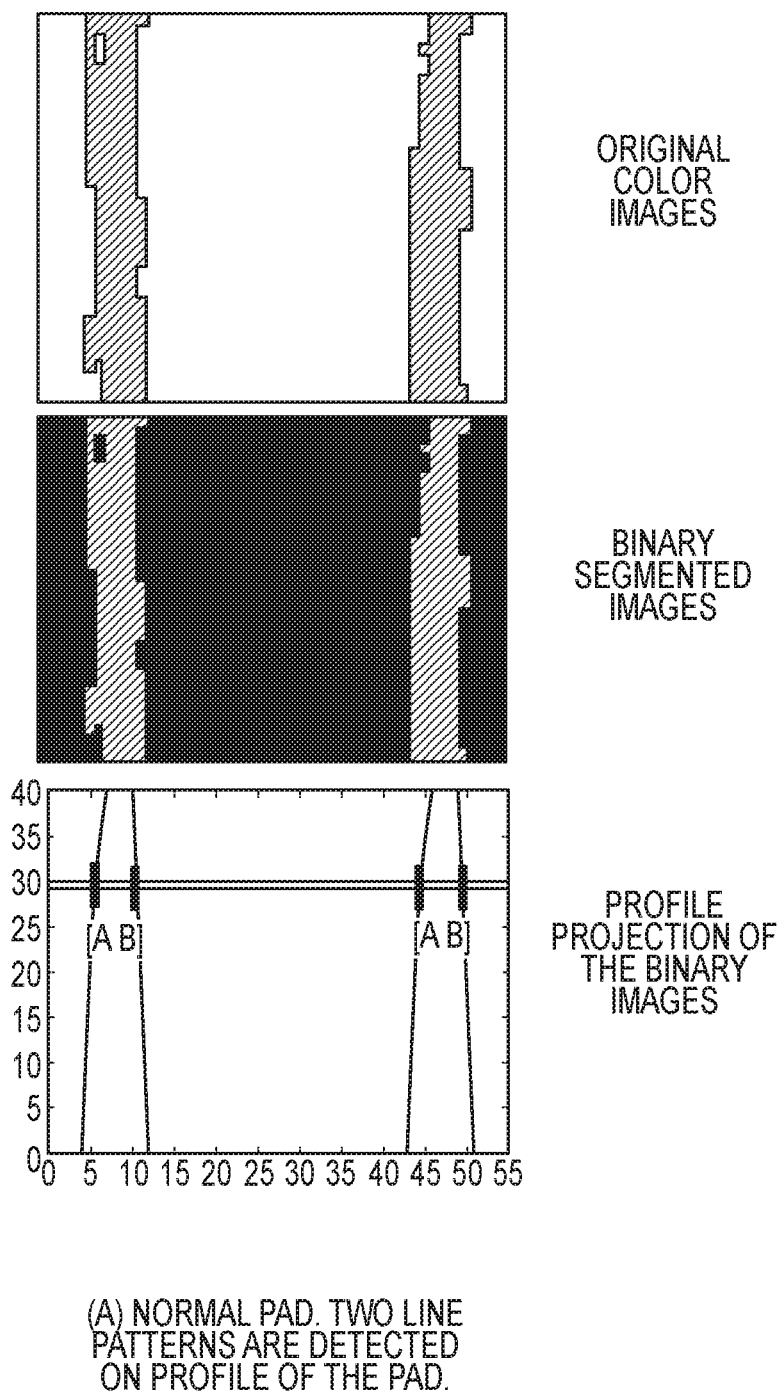
Figures 2, 9F:
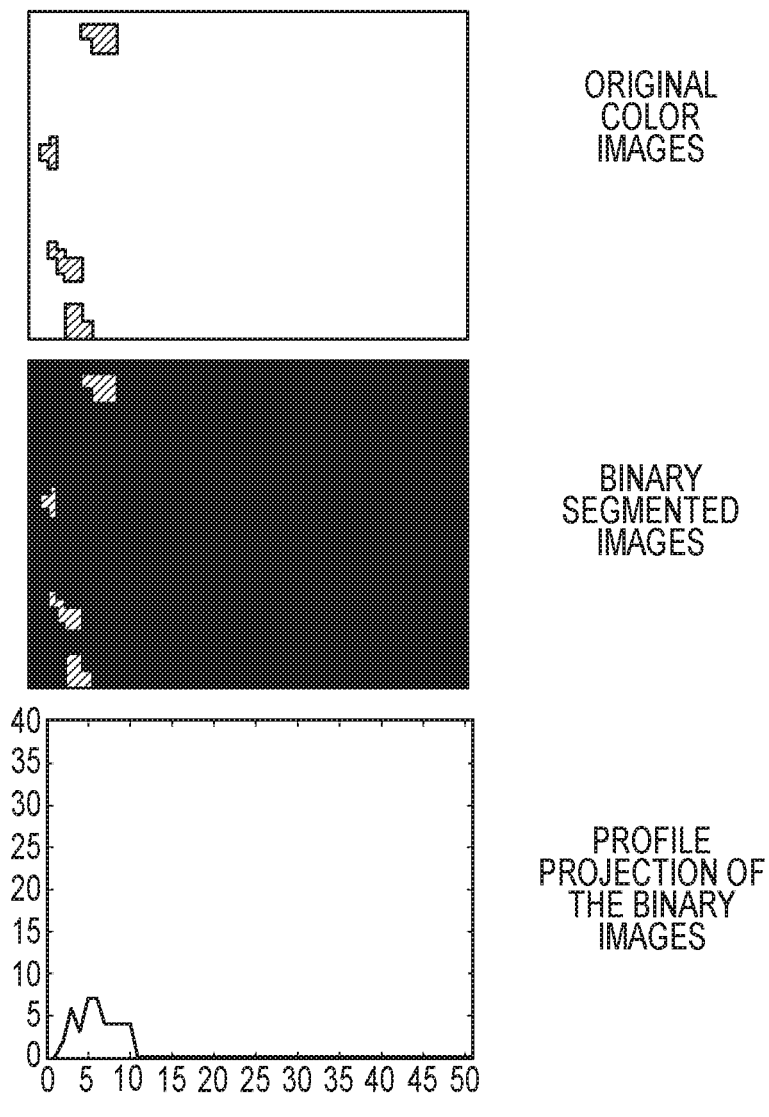

FIGS. 9B-E depict aspects of an exemplary segmentation process. First the RGB line color filter as shown in FIG. 9B (color filter used for line region segmentation) is applied to the strip images shown in FIG. 9C (original pad images). Only the pixels passed the color filter are left as demonstrated in FIG. 9D (regions left after applying the color filter), where pixels which do not pass the filter are set to background. FIG. 9E (binary image where the segmented regions are masked out) is the binary version of FIG. 9D, where the pixels in region passed the filter are labeled to 1 as foreground, and all the other pixels are labeled to 0 as background.

Embodiments of the present invention encompass a variety of techniques for the detection of sheared pads. In one exemplary embodiment, a subsequent line pattern detection stage can be applied on the segmented binary pad images.

For each pad, a 45 by 55 window centered on the pad region is examined for the presence of two line patterns. Firstly a vertical profile projection of the binary pad image is calculated as follows.

$$p(x) = \Sigma_y b(y,x)$$

Here, profile p(x) is a function of the horizontal x axis, and b(y, x) is the binary image, with b(y, x)=1 denoting a foreground pixel and 0 denoting background. Afterwards, the profile is separated from the middle into left and right parts, each of which is searched for a line pattern. A line pattern is detected if there exists a region, denoted as [a b] on the profile, with all the profile values p(x)>30, x∈[a b] and b−a>2. A pad is classified as normal only if lines are detected on both left and right parts of its profile.

FIGS. 9F-1, 9F-2, and 9F-3 depict aspects of exemplary line pattern detection techniques, according to embodiments of the present invention.

Embodiments of the present invention further encompass techniques for the selection of marking geometry and positioning. For example, in order to facilitate the manufacturability of the marking geometry and its placement on individual pads, it may be desirable to investigate any constraints of a continuous manufacturing process that is used in strip production. Other constraints to investigate include minimizing impact to detection algorithm development by simplifying the marking geometry as investigate the utilization of the strip geometry with respect to manufacturing, customer interaction, and instrument image processing. An exemplary manufacturing process involves the creation of a continuous roll of uncut strips consisting of twelve chemically impregnated, colored analyte pad materials individually adhered to white Mylar backing containing a black colored pre-printed product unique identifier. The cutting process of the continuous roll into individual strips then occurs independent of any specified starting point, solely relying on a fixed distance between cuts in order to define an individual strip. FIG. 9G depicts a continuous strip roll and an individual strip, according to embodiments of the present invention.

In order to prevent negative impact to results, a tolerance analysis was performed on the geometry of the pad and strip. This involved an evaluation of the stacked effects of the nominal positional distance, allowable positional distance variability, nominal pad size distance, and allowable pad size variability for each individual pad. The tolerance analysis provided the dimensional allowance of the marking geometry. The urinalysis instrument responsible for generating results from the strips is capable of a limited view of the strip, and subsequently each individual analyte pad. As each instrument is limited by the capabilities of the sensor capturing the image of the strip, a uniform marking geometry generates the most flexibility for algorithm development.

Figure 9H:
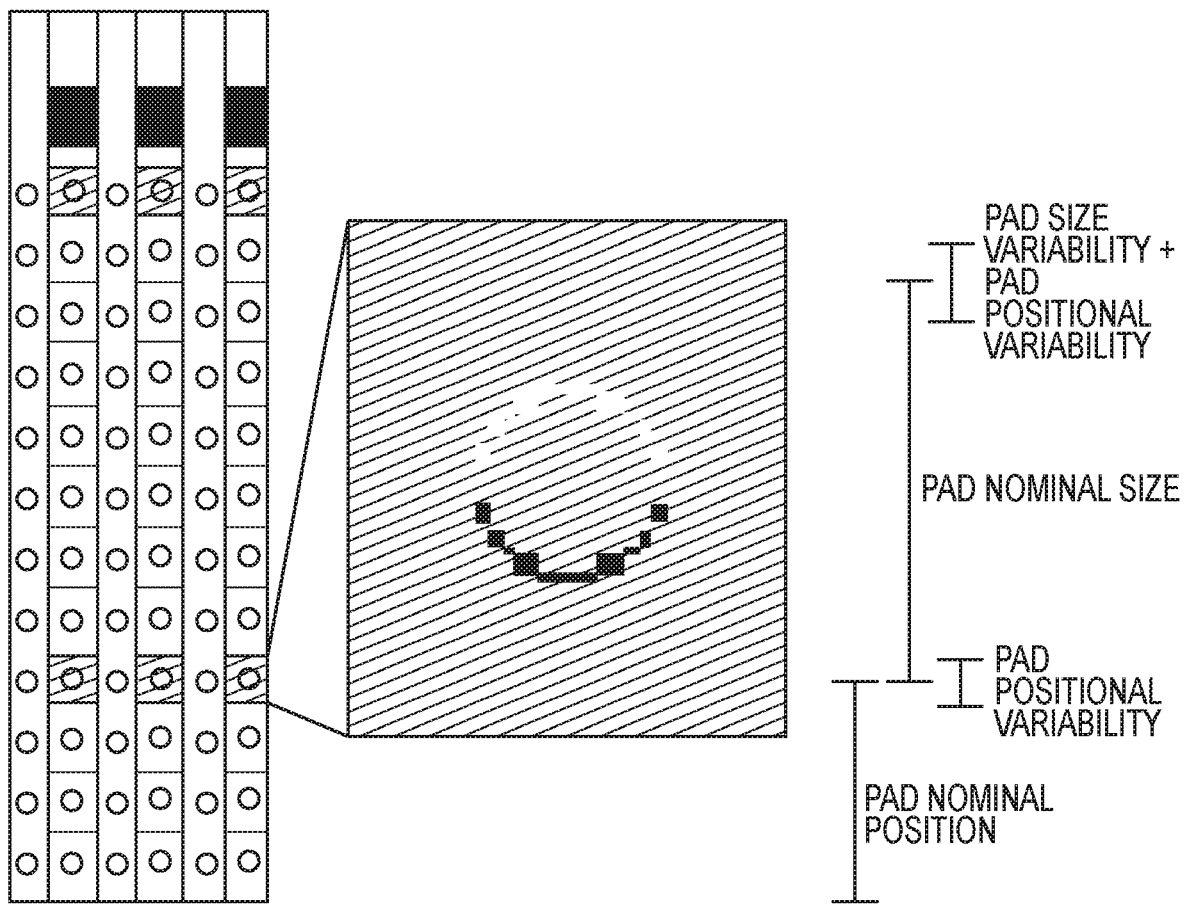
Figure 9I:
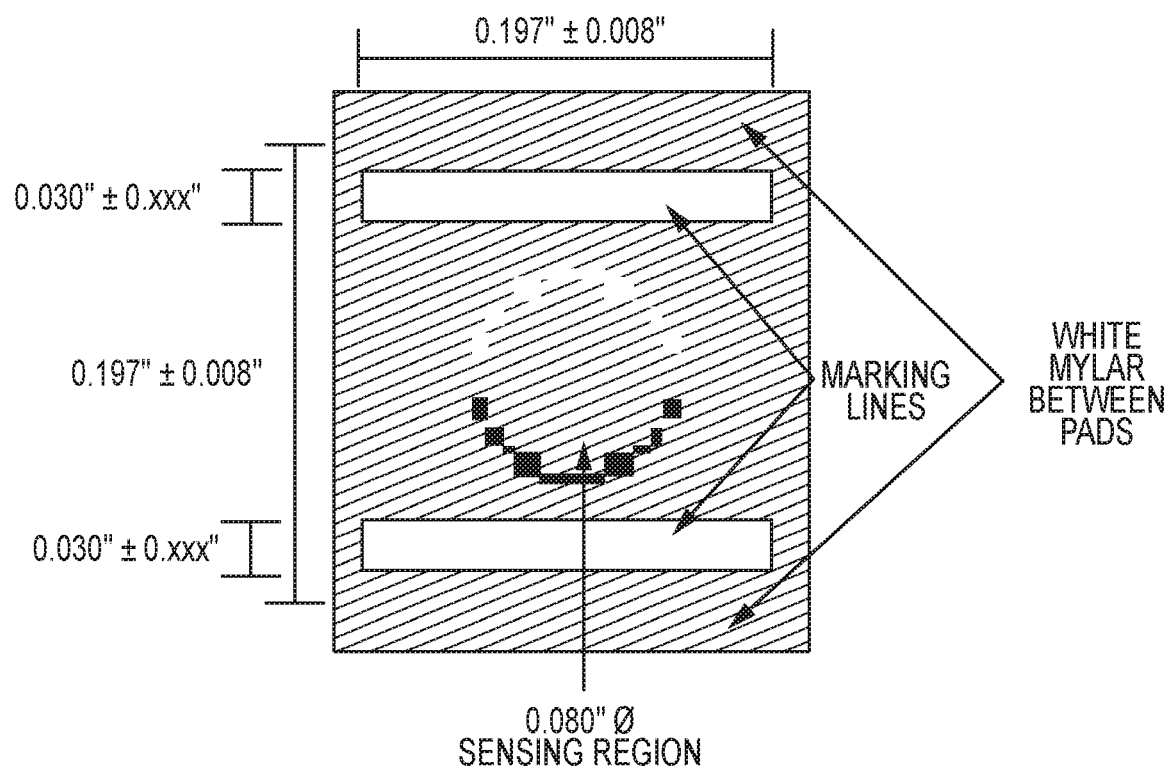

FIG. 9H depicts an instrument view of individual pad impact of dimension and tolerance, according to embodiments of the present invention. Each pad contains a sensing region (as seen by the urinalysis instrument) located near the center of pad that is utilized to calculate sample results. The orientation of the marking geometry was chosen to reside outside of this sensing region, near the upper and lower borders of each pad. Due to the above constraints, the marking geometry was selected as a continuous line along the direction of continuous strip roll motion in the current manufacturing production. As each of the twelve analyte pads is susceptible to shearing and have the same relative tolerance analysis results, all twelve analyte pads require similar marking geometry and relative marking positioning. For the ease of instrument detection, all marking geometries are set at equivalent dimensions and tolerances. FIG. 9I depicts an instrument view of individual pad with superimposed marking.

Embodiments of the present invention encompass various approaches for the selection of marking materials and methods. For example, to prevent a negative impact on the shearing issue, a non-contact marking process of inkjet printing can be selected. In order to account for instrument handling of the strips, additive methods (i.e. wax layer application, or the like) can be eliminated from consideration due to the likelihood of impact. Based on a survey of the extent of shearing on any given pad, it was discovered that shearing occurs almost exclusively along a two dimensional plane located at 50-80% of the depth of the analyte. An investigation into commercially available inks resulted in the selection of a pigmented ink. The selected pigmented ink consists of fine, high-contrast colored particles suspended in a non-reactive solvent. These fine colored particles are deposited as a high-contrast surface layer and are water insoluble. Due to the minimal amount of solvent present in the pigmented ink, reliability by design prevents the "bleeding" or fading of color on the analyte pad. The penetration depth due to the printing application of the pigmented ink is limited to not exceed 15% through the control of printing parameters.

A commercially available industrial continuous inkjet printer was selected. In order to achieve the desired marking geometry and orientation, a number of factors were determined: print head orientation, print head distance, and printing frequency. In order to utilize the multi-dot print head, it was rotated 90 degrees from its typical application. This rotation allows for multiple "dots" to come together to form the desired marking geometry. In order to generate the continuous marking geometry, the print frequency was controlled through the use of a shaft encoder. This shaft encoder converts the linear distance traveled by the continuous strip roll into an adjustable parameter of "Pulses per Revolution" (PPR). This provides a continuously adjusted scaling of marking material through a variable speed manufacturing process. The formula for conversion is as follows:

Pulses per Revolution (PPR)=$d$×(strokes per inch)

where $d$=distance of strip roll travel per revolution of shaft where strokes per inch=(strokes per character)×(characters per inch)

The following parameters can be considered. Print head Distance (The print head distance from the analyte pad can be characterized in x.xx" increments); Vision system (automated detection of proper positioning+quality check); Automated adjustment (automated movement of print head to proper position+precise movement device—i.e. stepper driven lead screw).

Table 1 provides a description of various results that may be obtained when analyzing a test pad, according to embodiments of the present invention.

TABLE 1

| Result | Description |
|---|---|
| Negative | A result that indicates that there was no response or detection. For example: for sheared pad detection a negative would be a normal pad, and a positive would be a sheared pad. |
| Positive | A results that indicates that there was a response or detection. For example: for sheared pad detection a Positive would indicate a sheared pad was detected (regardless of accurate or not). |
| True Positive | With respect to sheared pad detection, a condition where there is shearing and was detected. This condition is desirable. |
| False Positive | With respect to sheared pad detection, a condition where there is no shearing but was detected as missing. This condition is not desirable. |
| True Negative | With respect to sheared pad detection, a condition where there is no shearing and was not detected. This condition is desirable. |
| False Negative | With respect to sheared pad detection, a condition where there is shearing but was not detected. This condition is not desirable and considered an error and the biggest concern (Could produce Erroneous but credible results). |
| Sensitivity | TP/(TP + FN) |
| Specificity | TN/(TN + FP) |
| FN | False/Negative |
| FP | False/Positive |

According to some embodiments, a loose, sheared, and/or missing test pad can result in false negative results for any analyte(s), or false low or false high pH, but may not apply to the color, clarity, and specific gravity which is analyzed through a different mechanism and module. This can be hazardous, leading to a potential erroneous result received by or provided to a physician.

Embodiments of the present invention can address any of a variety of failure types. In some cases, an analyte pad can lose adhesion with test strip foil substrate material and come all the way off the test strip. In some cases, the analyte pad adhesive bonding adhesion may be lost and the analyte pad may be completely detached from the test strip Mylar substrate material.

As discussed elsewhere herein, embodiments of the present invention encompass systems and methods for the analysis of urine and related chemical constituents using test strips read by, for example, wavelength reflectance and specific gravity using the refractive index.

Reflectance photometry can analyze the intensity and color of light reflected from the reagent areas of a urinalysis test strip. For example, using three LEDs and one black and white complementary metal oxide semiconductor camera (CMOS), an optical system can read the color change in the urine strips after a sample is applied. The measurement of analytes on a chemistry strip can be based on optical measurement of percent reflectance of visible light flashed on reagent pads that undergo a color development reaction proportional to the analyte concentration. The sensor can be a complementary metal-oxide semiconductor (CMOS) digital camera assembly. A color change on the pads can be measured in a strip reading module where images are captured after the illumination, for example with 3 color LEDS (red, green and blue). In some cases, the color change of the pads can be measured with 3 colors at 8 time points with 15 second increments. An exemplary automated system can be used for the in vitro measurement of the various analytes in or characteristics of urine, including for example, bilirubin, urobilinogen, ketones, ascorbic acid, glucose, protein, blood, pH, nitrite, leukocyte esterase, specific gravity, color, clarity, and the like.

Figure 10:
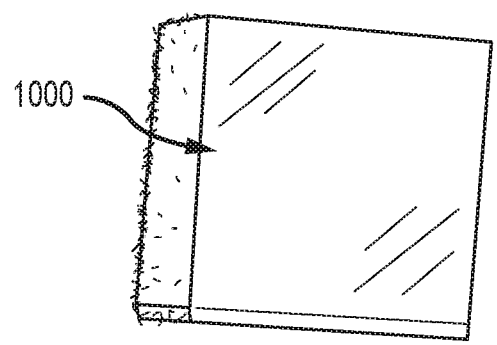
FIGS. 10-12 depict aspects of test strips according to embodiments of the present invention.
Figure 11:
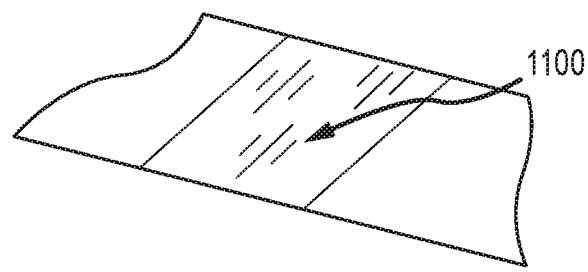

In FIGS. 10 and 11, the analyte pad adhesive bonding adhesion has been lost where a layer of adhesive 1000 is still on both the loose analyte pad bottom surface and at the top surface of the test strip Mylar substrate material 1100.

Figure 12:
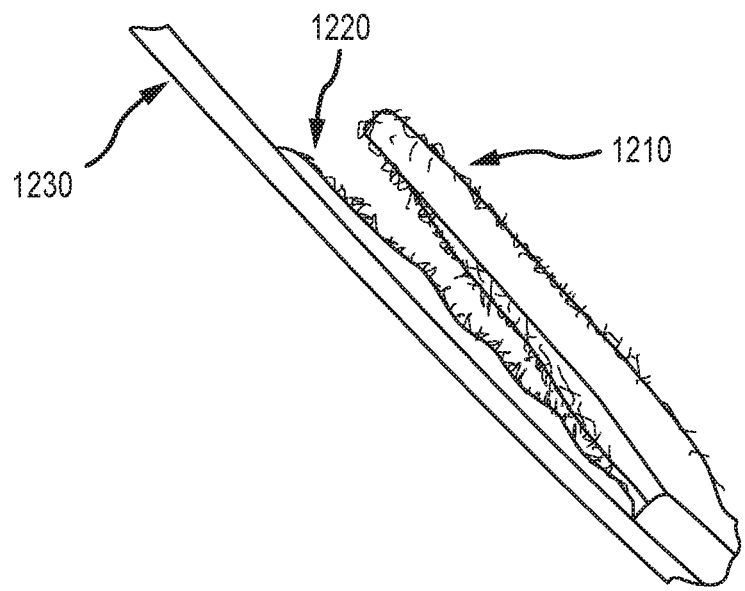

In some cases, the analyte pad has a layer that has come off or peeled off of the pad with the base part of the pad adhering to the test strip foil substrate material. This may be referred to as a sheared or split pad. FIG. 12 illustrates a shearing pad failure mode, where the analyte pad 1210 has separated and most likely will detach from the base layer 1220 of the analyte pad and test strip 1230 when there is a severe separation of the pad layer. The analyte pad base layer 1220 may still be adhering to the test strip substrate material 1230 (e.g. Mylar).

Figure 13:
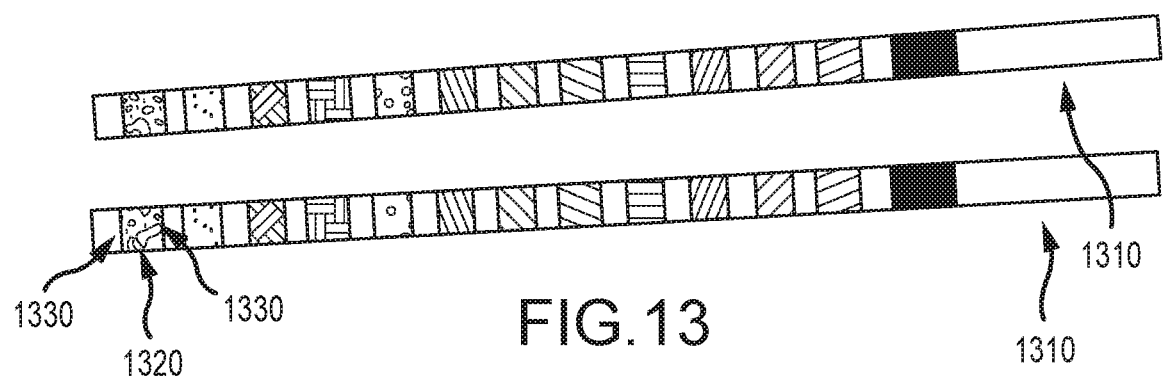
FIG. 13 depicts aspects of test strips with multiple pads, where individual pads have two fiducial mark lines, according to embodiments of the present invention.
Figure 14:
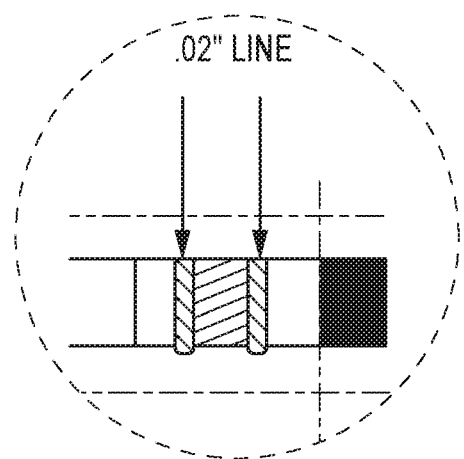
FIG. 14 depicts aspects of fiducial marks on a test pad, according to embodiments of the present invention.
Figure 15:
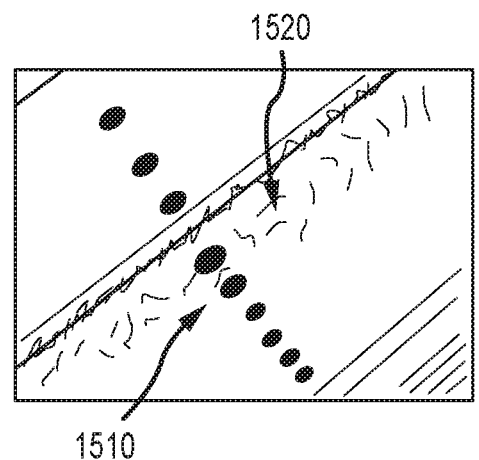
FIG. 15 depicts aspects of a fiducial mark on a test pad, according to embodiments of the present invention.

FIG. 13 depicts test strips 1310 with multiple pads 1320, where individual pads have two fiducial mark lines 1330 (e.g. 0.03 inch). Any of a variety of printing machines or techniques can be used to print the fiducial marks on the pads, including continuous inkjet (CIJ) technology. As shown in FIG. 14, fiducial marks may be provided as lines having a width of 0.02 inches. In some cases, printing can be performed in conjunction with or as part of a lamination process. As illustrated in FIG. 15, a fiducial mark may be provided as a dotted line 1510. Here, fiducial mark 1510 is printed on the pad 1520 and the ink of the mark does not penetrate all the way through the pad.

Figure 16:
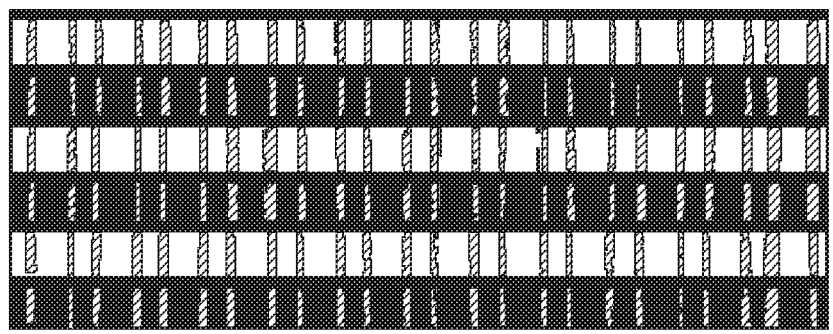
FIGS. 16-19 depict aspects of undosed and dosed test strips, according to embodiments of the present invention.

FIG. 16 depicts an undosed embodiment, with Whiteout Base Phthalo Blue (516) and Lemon Yellow (346). The three undosed strips are marked using a Whiteout base, with pads 1-3, 5-11 having Phthalo Blue (516), and pads 4, 12 having Lemon Yellow (346). The observed detection accuracy rate was 100%.

Figure 17:
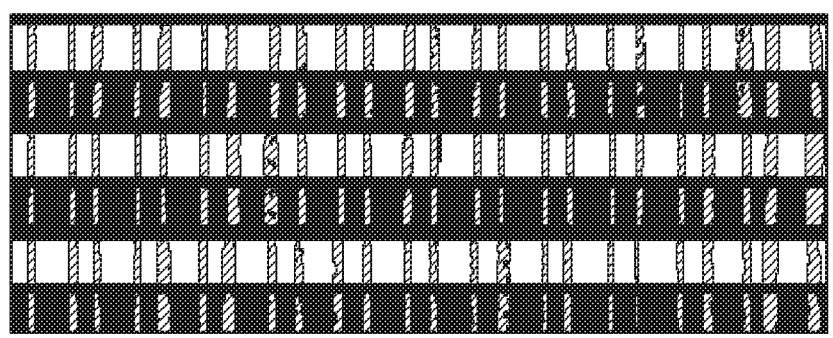

FIG. 17 depicts a dosed embodiment, controls, with Whiteout Base Phthalo Blue (516) and Lemon Yellow (346). The CA, CB, CC dosed strips are marked using a Whiteout base, with pads 1-3, 5-11 having Phthalo Blue (516) and pads 4, 12 having Lemon Yellow (346). The observed detection accuracy rate was 100%. CA, CB and CC are controls that have different reagents and give different colors.

Figure 18:

FIG. 18 depicts a dosed embodiment, with sheared marked pads. There is one CA dosed sheared strip, with pads 1-3, 5-11 having Emerald (235), and pads 4, 12 having Lemon Yellow (346). The observed detection accuracy rate was about 92%.

Figure 19:
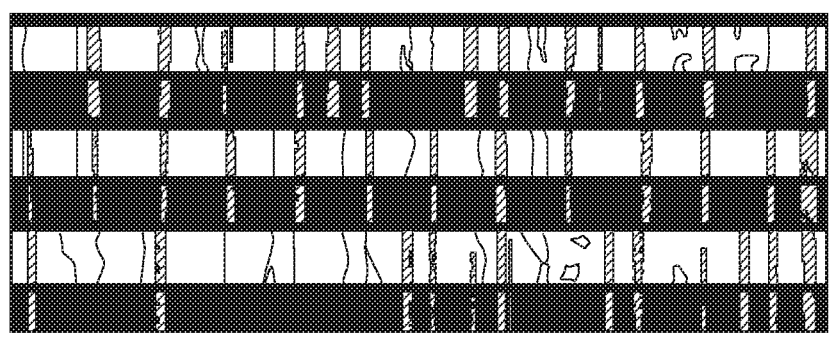

FIG. 19 depicts an undosed embodiment, with three undosed sheared marked strips. The first strip includes pads 1-12 having Phthalo Blue (516). The second strip includes pads 1-3, 5-11 having Emerald (235) and pads 4, 12 having Lemon Yellow (346). The third strip includes pads 1-3, 5-11 having Phthalo Blue (516) and pads 4, 12 having warm grey 1 (134). The observed detection accuracy rate was 100%.

The results are summarized in Table 2.

TABLE 2

| DataSets | Detection Accuracy |
| --- | --- |
| Undosed - Whiteout Base Phthalo Blue (516) - Lemon Yellow (346) | 100% |
| Controls - Whiteout Base Phthalo Blue (516) - Lemon Yellow (346) | 100% |
| Dosed with CA - Sheared Marked Pads | 92% |
| Undosed - Sheared Marked Pads | 100% |

It was observed a mark color having a noticeable contrast with the pad color provides good results. To achieve good image contrasts, it may be desirable to use different colors to mark different pads. It may also be desirable to produce marks having a certain width, or certain minimum width. This may help overcome any limitations of image resolution. This may also help overcome issues related to translation between R, G, B channels images. Further, it may be desirable to produce strips where the ink mark does not bleed or blend with the pad color.

Figure 20:
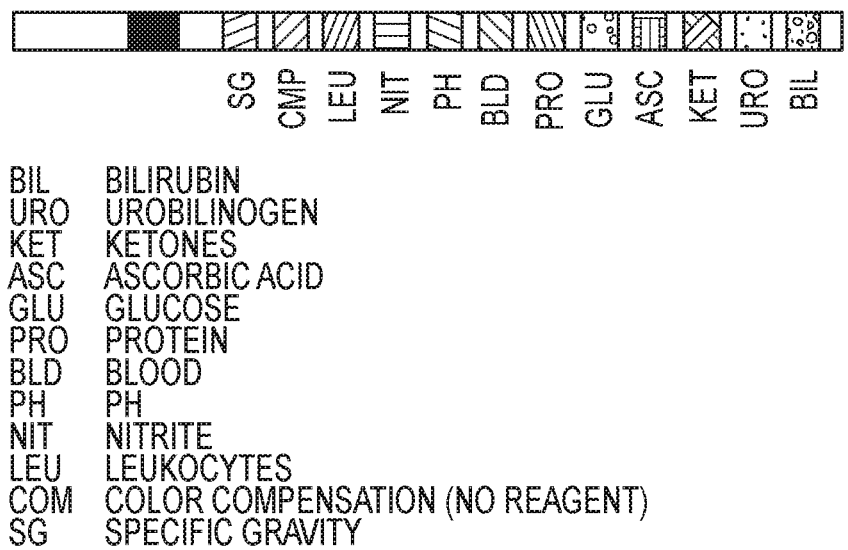
FIG. 20 depicts aspects of exemplary urine chemistry strip having a particular combination of impregnated chemistry and color compensation pads, according to embodiments of the present invention.

FIG. 20 depicts an exemplary urine chemistry strip having a particular combination of impregnated chemistry and color compensation pads. Embodiments of the present invention encompass such strips and their use and manufacture, where the strips include fiducial marks as discussed elsewhere herein.

Figure 21:
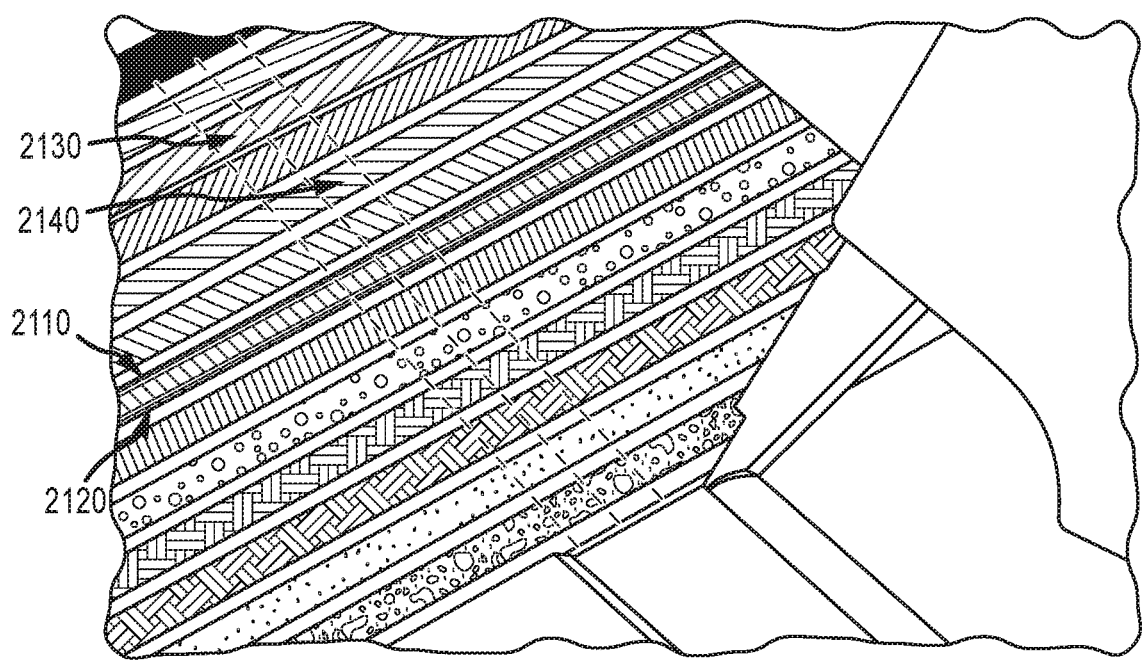
FIG. 21 depicts aspects of a test strip manufacturing process, according to embodiments of the present invention.

FIG. 21 depicts aspects of a manufacturing process, where fiducial marks 2110, 2120 can be applied, and individual strips 2130, 2140 can be cut. Printing of the fiducial marks on the pad material can be performed either prior to or subsequent to cutting of the individual strips.

Figure 23:
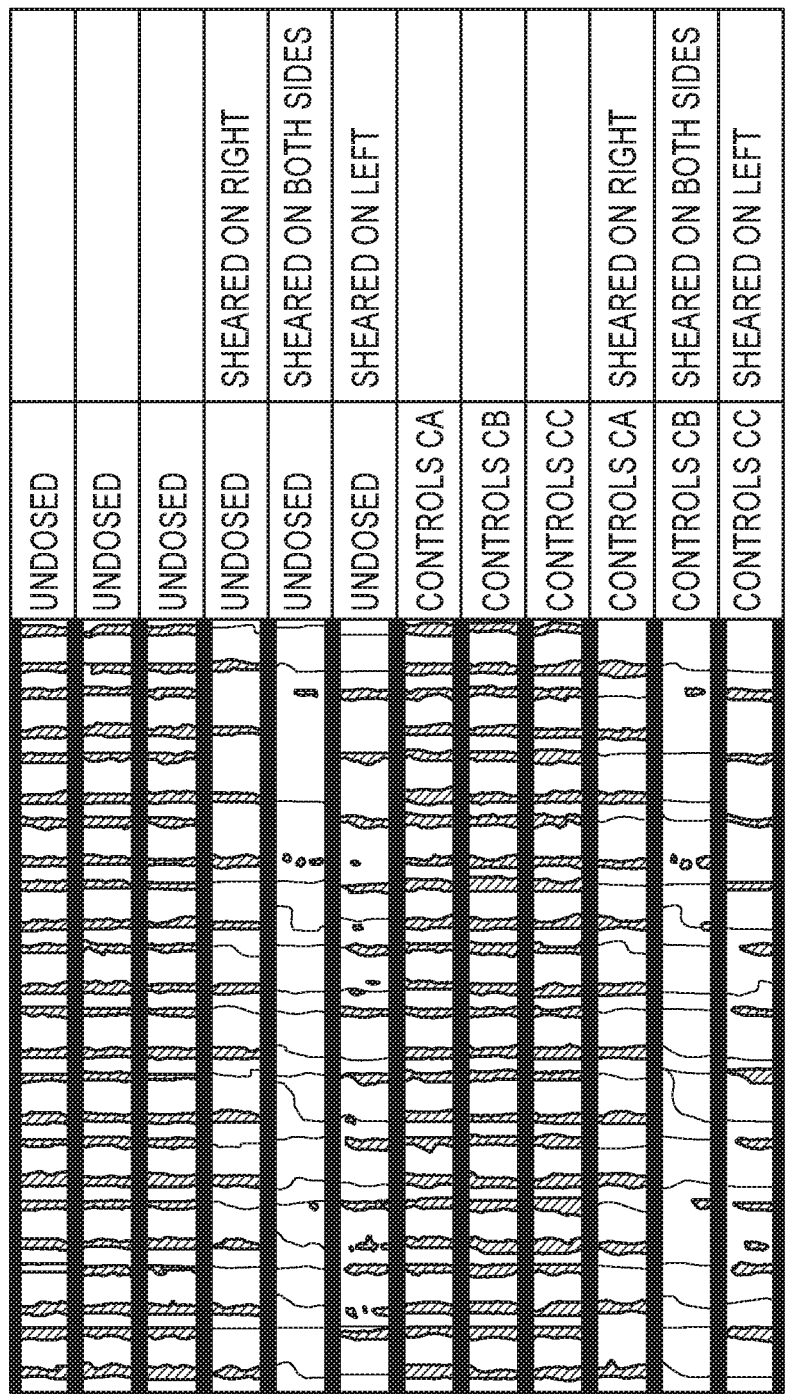
Figure 24:
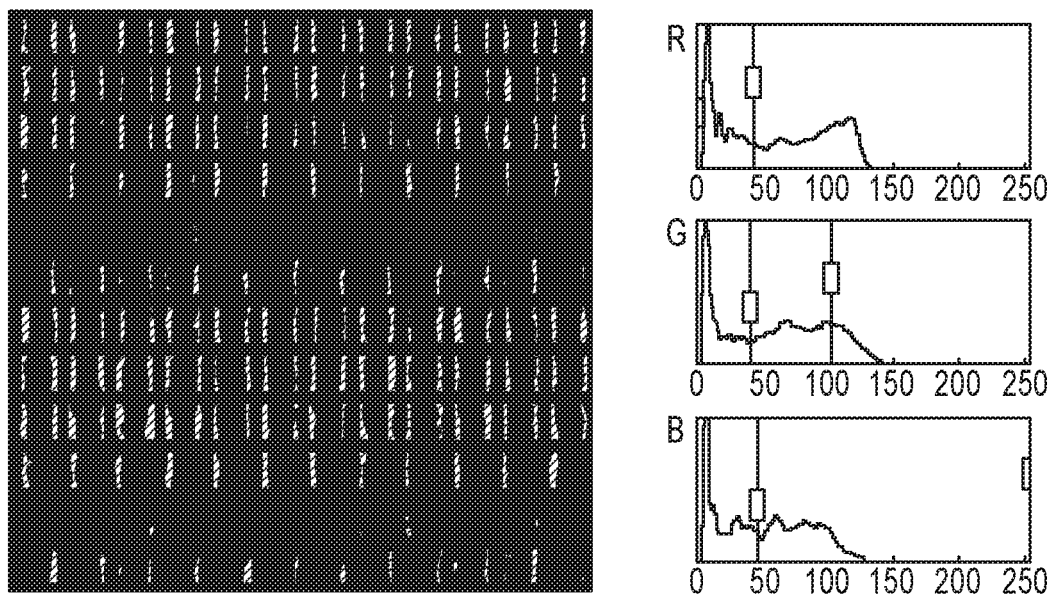
Figure 25:
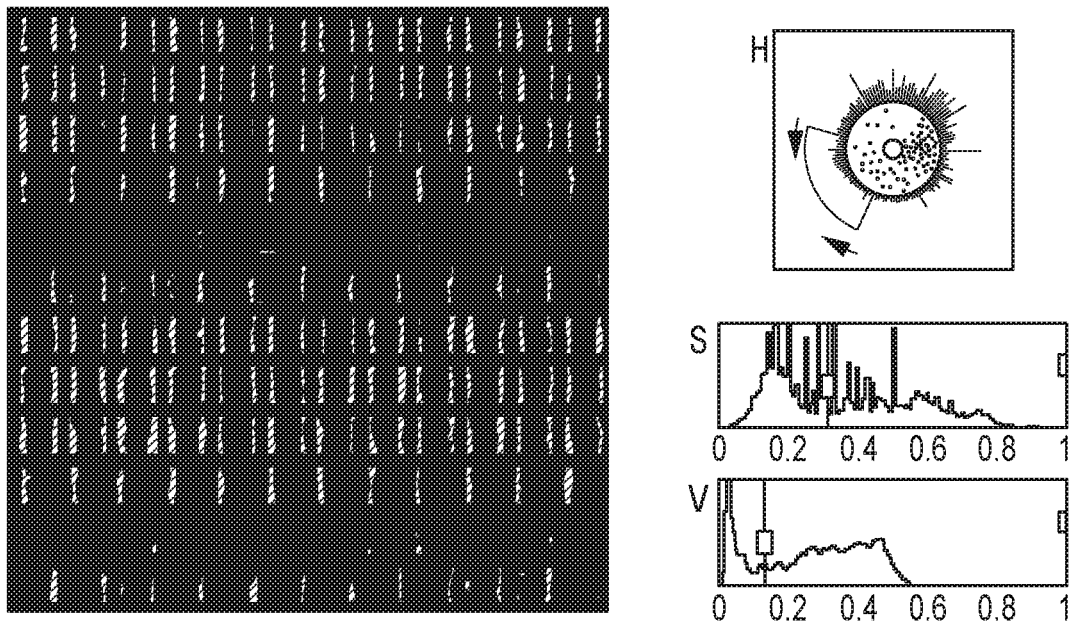
Figures 26, 27:
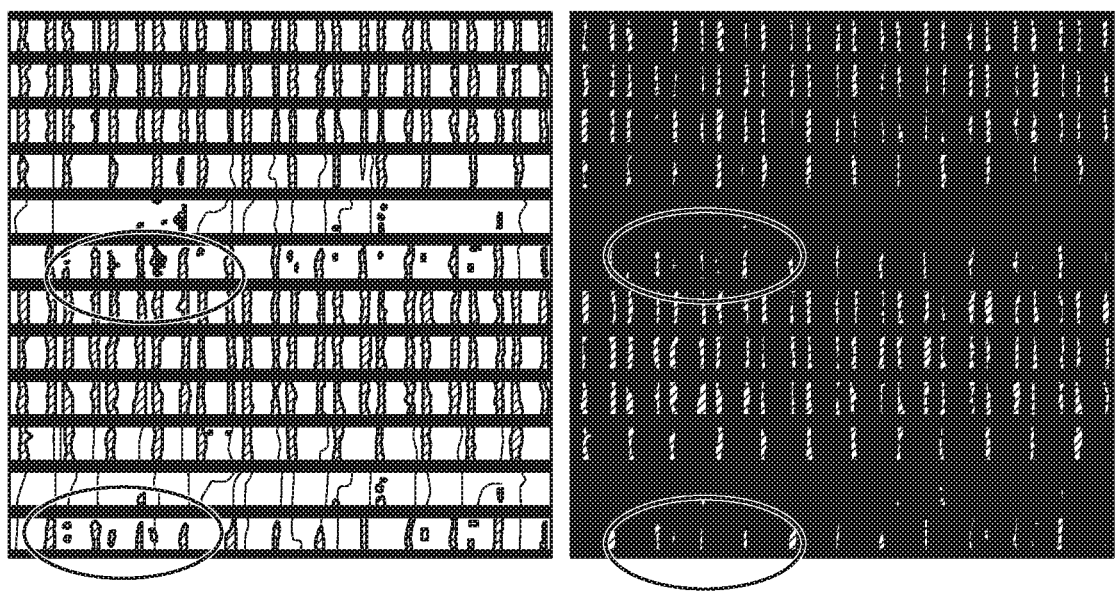
Figure 28:
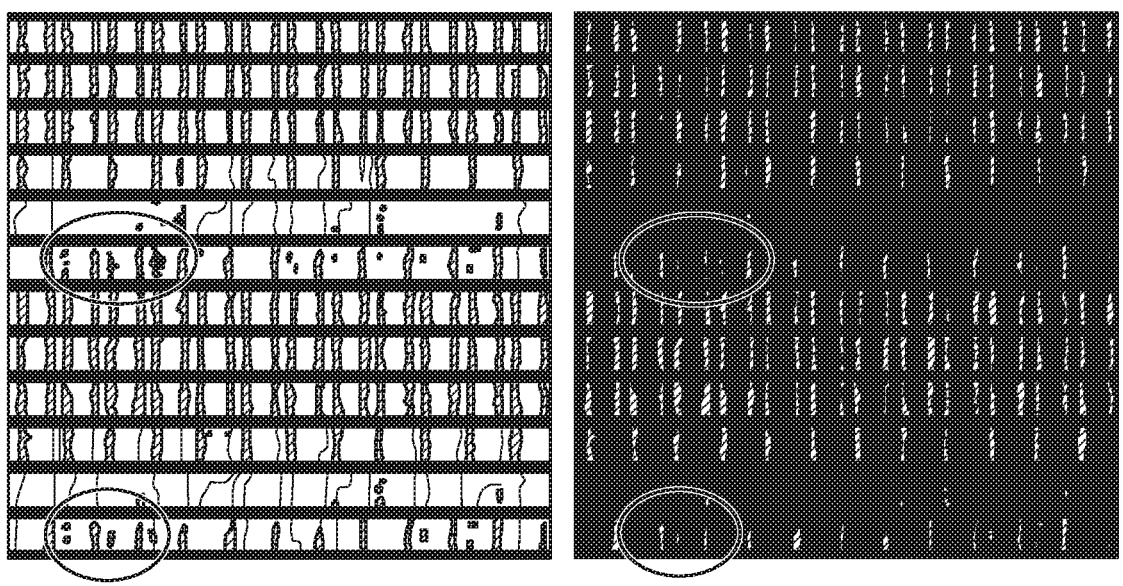

FIGS. 22-28 depict aspects of various experimental processes and results. Briefly, FIG. 22 describes a dataset used in an experiment, FIG. 23 shows images of 12 strips of the dataset, FIG. 24 shows segmentation results when an RGB color filter is applied, FIG. 25 shows segmentation results when an HSV color filter is applied, FIG. 26 shows sheared pad detection results from using RGB and HSV color filter on undosed and dosed strips, FIG. 27 shows FN (False Negative) detection examples (marked in red ellipse) when using RGB color, and FIG. 28 shows FN detection examples (marked in red ellipse) when using HSV color. More detailed descriptions are provided below.

FIG. 22 depicts a dataset of 12 strips used in one of detection experiment. There are three undosed strips, three undosed strips with sheared marked pad, three CA, CB, CC dosed strips and three CA, CB, CC dosed strips with sheared pads. The 12 undosed and CA, CB, CC dosed strips are marked using a Whiteout base, with pads 1-12 having Phthalo Blue (516).

FIG. 23 depicts the images of the 12 strips dataset described in FIG. 22. There are three undosed strips, three undosed strips with sheared marked pad, three CA, CB, CC dosed strips and three CA, CB, CC dosed strips with sheared pads. The 12 undosed and CA, CB, CC dosed strips are marked using a Whiteout base, with pads 1-12 having Phthalo Blue (516).

FIG. 24 depicts the binary version of FIG. 23, where the segmented regions are masked out. The RGB color filter range can be selected as follows: R=0-50; G=50-100; B=50-250 in this case.

FIG. 25 depicts a binary version of FIG. 23, where the segmented regions are masked out. The HSV color space is applied, and filter range can be selected as follows: H=160-220; S=0.3-1; V=0.1-1 in this case.

FIG. 26 depicts a tabular summary of detection results when apply both RGB and HSV color filters on undosed and dosed strips.

FIG. 27 depicts FN detection examples (marked in red ellipse) when using RGB color filter in the detection process.

FIG. 28 depicts FN detection examples (marked in red ellipse) when using HSV color filter in the detection process.

An exemplary method of detecting the presence of a pad on a test chemistry strip, can include, for example, receiving a test strip with at least one pad, where each pad has a pad width with ink marked at the edge of the pad. Methods can also involve providing a light source, capturing an image, segmenting out marked line regions, for example by applying threshold in RGB color spaces, cleaning the binary segmented image, filtering out small areas that correspond to noise, and checking the width of the line equal to or larger than 2 pixel, to see if a line exists. For example, if both lines exist within the pad width, the pad can be considered to be normal. Otherwise, the pad can be considered to be sheared. In some cases, the pad width is 0.197 inches. The depth of the pad can be dependent on the raw stock used to fabricate the pad. In some cases, the printed mark (e.g. line) can have a width having a value within a range from about 0.020 inches to about 0.030 inches. In some cases, the printed mark can have a depth that is less than about 20% of the pad thickness. In some cases, the RGB range can be selected as follows: R=0-50; G=50-100; B=50-250. In some cases, the RGB range can be selected as follows: R=0-50; G=40-255; B=50-255. In some cases, the RGB range can be selected based on the ink that is used for printing.

All patent filings, scientific journals, books, treatises, and other publications and materials discussed in this application are hereby incorporated by reference for all purposes. A variety of modifications are possible within the scope of the present invention. A variety of parameters, variables, factors, and the like can be incorporated into the exemplary method steps or system modules. While the specific embodiments have been described in some detail, by way of example and for clarity of understanding, a variety of adaptations, changes, and modifications will be obvious to those of skill in the art.

All features of the described systems and/or devices are applicable to the described methods mutatis mutandis, and vice versa. Each of the calculations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modifications, adaptations, and changes may be employed.

The methods and apparatuses of the present invention may be provided in one or more kits for such use. The kits may comprise a system or device for analyzing a biological sample such as urine, and instructions for use. Optionally, such kits may further include any of the other system components described in relation to the present invention and any other materials or items relevant to the present invention. The instructions for use can set forth any of the methods as described above.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the claims.

What is claimed is:

1. A method for detecting the presence of a test pad on a test strip, the method comprising:
    receiving a test strip having at least one test pad, each test pad having a pad width with ink disposed on two ink zones at two opposing sides of the width of the pad;
    illuminating the at least one test pad with a light source;
    detecting reflected signals from the test pad;
    generating an image comprising of pixels of the two ink zones based on the reflected signals;
    detecting the presence of each of the ink zones by comparing the number of consecutive pixels against a predetermined threshold; and
    determining the presence of the test pad on the test strip if two ink zones are detected within the pad width.

2. The method of claim 1, wherein the pad width is about 0.2" (0.51 cm).

3. The method of claim 1, wherein the predetermined threshold is 2 pixels.

4. The method of claim 1, wherein the step of generating an image comprises:
    converting the reflected signals to a binary image by applying a set of thresholds in a RGB color space;
    cleaning the binary image; and
    filtering small areas of the image corresponding to noise.

5. The method of claim 4, wherein the set of thresholds in the RGB color space is 0 to 50 for Red, 40 to 255 for Green, and 50 to 255 for Blue.

6. The method of claim 1, wherein the pad has a first color and the ink has a second color that is different from the first color.

7. The method of claim 6, wherein the second color is phthalo blue or emerald.

8. The method of claim 1, wherein a width of each ink zone is about 0.02" (0.51 mm) to 0.03" (0.76 mm).

9. The method of claim 1, wherein the pad has an upper surface and a pad thickness and is absorbent, and the ink is absorbed into the pad at a depth of about 20% of the pad thickness from the surface.

10. A system for detecting the presence of a test pad on a test strip, the system comprising:
    a test pad on a test strip, the test pad having ink disposed on two ink zones at two opposing sides of the width of the pad
    a light source for illuminating the test pad;
    an optical unit for detecting reflected signals from the test pad and to create a pixel-based image of the ink zones, wherein the pixel-based image comprises a plurality of pixel sets and each pixel set corresponds to one of the two ink zones; and
    a processor for detecting the presence of each of the ink zones by comparing the number of consecutive pixels against a predetermined threshold; and determining the presence of the test pad on the test strip if two ink zones are detected within the pad width.

11. The system of claim 10, wherein the pad width is about 0.2" (0.51 cm).

12. The system of claim 10, wherein the predetermined threshold is 2 pixels.

13. The system of claim 10, wherein the optical unit comprises an image processor, the image processor being configured to:
    convert the reflected signals to a binary image by applying a set of thresholds in a RGB color space;
    clean the binary image; and
    filter small areas of the image corresponding to noise.

14. The system of claim 13, wherein the set of thresholds in the RGB color space is 0 to 50 for Red, 40 to 255 for Green, and 50 to 255 for Blue.

15. The system of claim 10, wherein the pad has a first color and the ink has a second color that is different from the first color.

16. The system of claim 15, wherein the second color is phthalo blue or emerald.

17. The system of claim 10, wherein a width of each ink zone is about 0.02" (0.51 mm) to 0.03" (0.76 mm).

18. The system of claim 10, wherein the pad has an upper surface and a pad thickness and is absorbent, and the ink is absorbed into the pad at a depth of about 20% of the pad thickness from the surface.

19. The system of claim 10, when also dependent on claim 13, wherein the set of thresholds in the RGB color space is 0 to 50 for Red, 40 to 255 for Green, and 50 to 255 for Blue.

* * * * *